United States Patent
Ohba et al.

(10) Patent No.: US 9,148,564 B2
(45) Date of Patent: Sep. 29, 2015

(54) IMAGE PICKUP APPARATUS, INFORMATION PROCESSING SYSTEM AND IMAGE DATA PROCESSING METHOD

(71) Applicant: Sony Computer Entertainment Inc., Tokyo (JP)

(72) Inventors: Akio Ohba, Kanagawa (JP); Hiroyuki Segawa, Kanagawa (JP); Hideyuki Saito, Tokyo (JP); Hidehiko Ogasawara, Tokyo (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 50 days.

(21) Appl. No.: 14/250,677

(22) Filed: Apr. 11, 2014

(65) Prior Publication Data
US 2014/0320689 A1 Oct. 30, 2014

(30) Foreign Application Priority Data
Apr. 26, 2013 (JP) .................................. 2013-094402

(51) Int. Cl.
H04N 5/232 (2006.01)
H04N 5/33 (2006.01)
H04N 9/04 (2006.01)
H04N 13/00 (2006.01)
G06T 3/40 (2006.01)

(52) U.S. Cl.
CPC .......... *H04N 5/23229* (2013.01); *G06T 3/4038* (2013.01); *H04N 5/332* (2013.01); *H04N 9/045* (2013.01); *H04N 13/0048* (2013.01)

(58) Field of Classification Search
CPC .......... H04N 5/23229; H04N 13/0048; H04N 5/332; H04N 9/045; G06T 3/4038
See application file for complete search history.

(56) References Cited

U.S. PATENT DOCUMENTS

| 7,200,247 | B2 | 4/2007 | Ohba |
| 7,620,206 | B2 | 11/2009 | Ohba |
| 8,189,864 | B2 * | 5/2012 | Kojo .............................. 382/103 |
| 8,223,220 | B2 * | 7/2012 | Inada et al. ................. 348/222.1 |
| 2004/0240740 | A1 | 12/2004 | Ohba |
| 2007/0110279 | A1 | 5/2007 | Ohba |
| 2012/0005630 | A1 * | 1/2012 | Ohba et al. .................... 715/853 |

FOREIGN PATENT DOCUMENTS

EP 0999518 A1 5/2000

* cited by examiner

*Primary Examiner* — Twyler Haskins
*Assistant Examiner* — Padma Haliyur
(74) *Attorney, Agent, or Firm* — Matthew B. Dernier, Esq.

(57) ABSTRACT

An image pickup apparatus includes: an image data production unit configured to produce data of a plurality of kinds of images from a picked up image and successively output the data; an image synthesis unit configured to cyclically connect the data of the plurality of kinds of images for each pixel string within a range set in advance for each of the kinds of the images and output the connected data as a stream to produce a virtual synthetic image; and an image sending unit configured to accept, from a host terminal, a data transmission request that designates a rectangular region in the virtual synthetic image, extract and connect data from the stream and transmit the connected data as a new stream to the host terminal.

8 Claims, 17 Drawing Sheets

F I G . 4
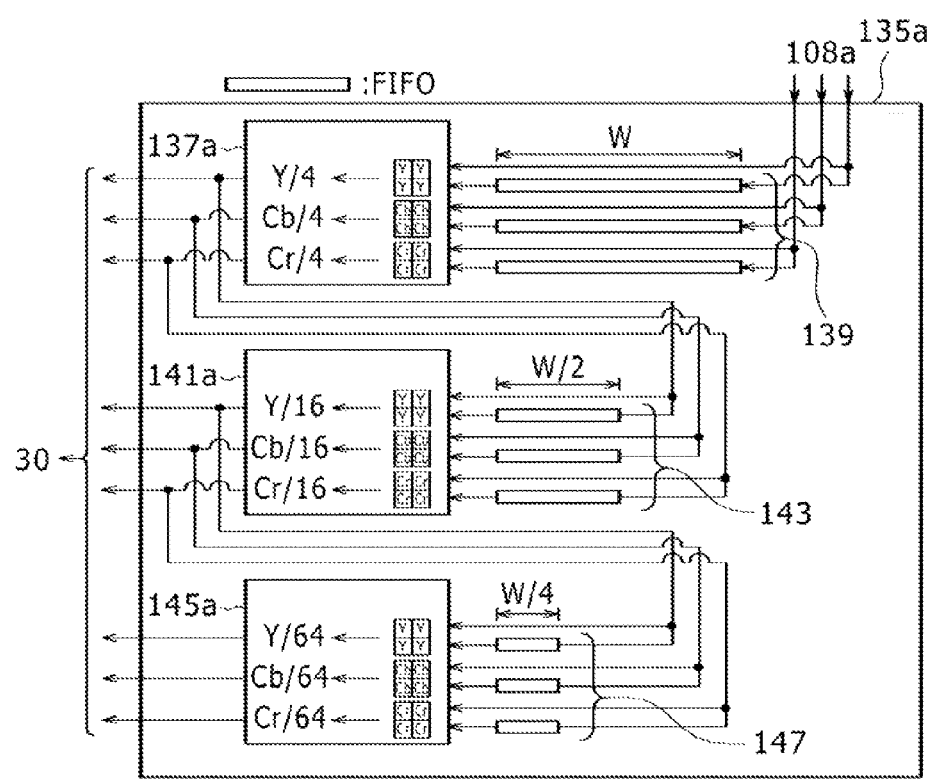

IMAGE PICKUP APPARATUS, INFORMATION PROCESSING SYSTEM AND IMAGE DATA PROCESSING METHOD

BACKGROUND

The present disclosure relates to a technology for performing information processing using a picked up image.

In the related art, a game is known in which an image of part of the body of a user of a video camera such as the head is picked up by the video camera. Then, a predetermined region such as a region including an image of an eye, a mouth, or a hand is extracted from the picked up image. Thereafter, the image of the extracted region is replaced with a different image, and the different image is displayed on a display unit. Such a game as described above is disclosed, for example, in European Patent Application Publication No. 0999518 (hereinafter referred to as Patent Document 1). Also a user interface system is known wherein a movement of a mouth or a hand in an image picked up by a video camera is received as an operation instruction to an application.

SUMMARY

In such a technology as described above, an image of a high resolution is used in order to extract a predetermined region such as a region including a mouth, a hand or the like from the image. However, as the performance of an image pickup element of a video camera enhances, the amount of image data increases. This gives rise to a problem that this increases the cost for data mining processes such as filtering, scaling, cropping processes and the like, which provide information on an appropriate scale for use for compression and decompression processes for data transfer or recognition, detection, measurement processes and the like. The increase of the amount of image data further gives rise to a different problem that this increases the latency from the time of inputting to the camera to the time of outputting from each process. Further, the use of the camera as a user interface gives rise to a different problem that the increase of the latency dramatically degrades the usability. In this manner, even if the image pickup element of a video camera is improved in performance, there is the possibility that the performance of the system as a whole may be deteriorated.

Therefore, the present disclosure contemplates provision of an image processing technology that can suppress the latency from the time of image pickup to the time of image display using the picked up image data while an image pickup element of a high performance is used.

According to an embodiment of the present technology, there is provided an image pickup apparatus including an image data production unit configured to produce data of a plurality of kinds of images from a picked up image obtained by image pickup of an image pickup object and successively output the data for pixels of one horizontal line; an image synthesis unit configured to cyclically connect the data of the plurality of kinds of images outputted from the image data production unit for each pixel string within a range set in advance for each of the kinds of the images and output the connected data as a stream to produce a virtual synthetic image that includes the plurality of kinds of images and in which a pixel string when the connection makes one round is a pixel string for one horizontal line; and an image sending unit configured to accept, from a host terminal connected to the image pickup apparatus, a data transmission request that designates a rectangular region in the virtual synthetic image, extract and connect data from the stream in accordance with the data transmission request and transmit the connected data as a new stream to the host terminal. The image synthesis unit connects pixel stings as a stream of the plurality of kinds of images such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line.

According to another embodiment of the present technology, there is provided an information processing system including an image pickup apparatus configured to produce data of a plurality of kinds of images from a picked up image obtained by image pickup of an image pickup object; and a host terminal configured to acquire at least part of the data of the images and utilize the acquired data to carry out predetermined information processing. The image pickup apparatus includes an image data production unit configured to produce data of the plurality of kinds of images and successively output the produced data for each pixel in one horizontal line; an image synthesis unit configured to cyclically connect the data of the plurality of kinds of images outputted from the image data production unit for each pixel string within a range set in advance for each of the kinds of the images and output the connected data as a stream to produce a virtual synthetic image that includes the plurality of kinds of images and in which a pixel string when the connection makes one round is a pixel string for one horizontal line; and an image sending unit configured to accept, from the host terminal, a data transmission request that designates a rectangular region in the virtual synthetic image, extract and connect data from the stream in accordance with the data transmission request and transmit the connected data as a new stream to the host terminal. The image synthesis unit connects pixel stings of the plurality of kinds of images such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line. The host terminal includes a data requesting unit configured to request at least part of data of the plurality of kinds of images produced by the image pickup apparatus by designating a rectangular region of the virtual synthetic image; and a data development unit configured to separate the stream transmitted thereto from the image pickup apparatus into data of the individual images based on information of the designated rectangular region, return the separated data to the positions in the original pixel strings to restore the image and then develop the image into a memory.

According to a further embodiment of the present technology, there is provided an image data processing method carried out by an image pickup apparatus, including acquiring a picked up image obtained by image pickup of an image pickup object from an image pickup element, producing data of a plurality of kinds of images based on the acquired picked up image and successively outputting the data for pixels of one horizontal line; cyclically connecting the data of the outputted plurality of kinds of images for each pixel string within a range set in advance for each of the kinds of the images and outputting the connected data as a stream to produce a virtual synthetic image that includes the plurality of kinds of images and in which a pixel string when the connection makes one round is a pixel string for one horizontal line; and accepting, from a host terminal connected to the image pickup apparatus, a data transmission request that designates a rectangular region in the virtual synthetic image, extracting and connecting data from the stream in accordance with the data transmission request and transmitting the connected data as a new stream to the host terminal. The production of the synthetic image includes connection of pixel stings of the plurality of kinds of images carried out such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line.

It is to be noted that also arbitrary combinations of the components described above and those obtained by converting representations of the present disclosure between methods, apparatus, systems, computer programs, recording media in or on which any of the computer programs is recorded and so forth are effectively applied as different modes of the present technology.

With the present technology, various information processes can be carried out while the latency from image pickup to display of the image using data of the picked up image is suppressed.

The above and other objects, features and advantages of the present technology will become apparent from the following description and the appended claims, taken in conjunction with the accompanying drawings in which like parts or elements are denoted by like reference characters.

BRIEF DESCRIPTION OF THE DRAWINGS

FIG. 4 is a block diagram particularly depicting a configuration of a pyramid filter section shown in FIG. 3;

DETAILED DESCRIPTION OF THE PREFERRED EMBODIMENT

Figure 1:
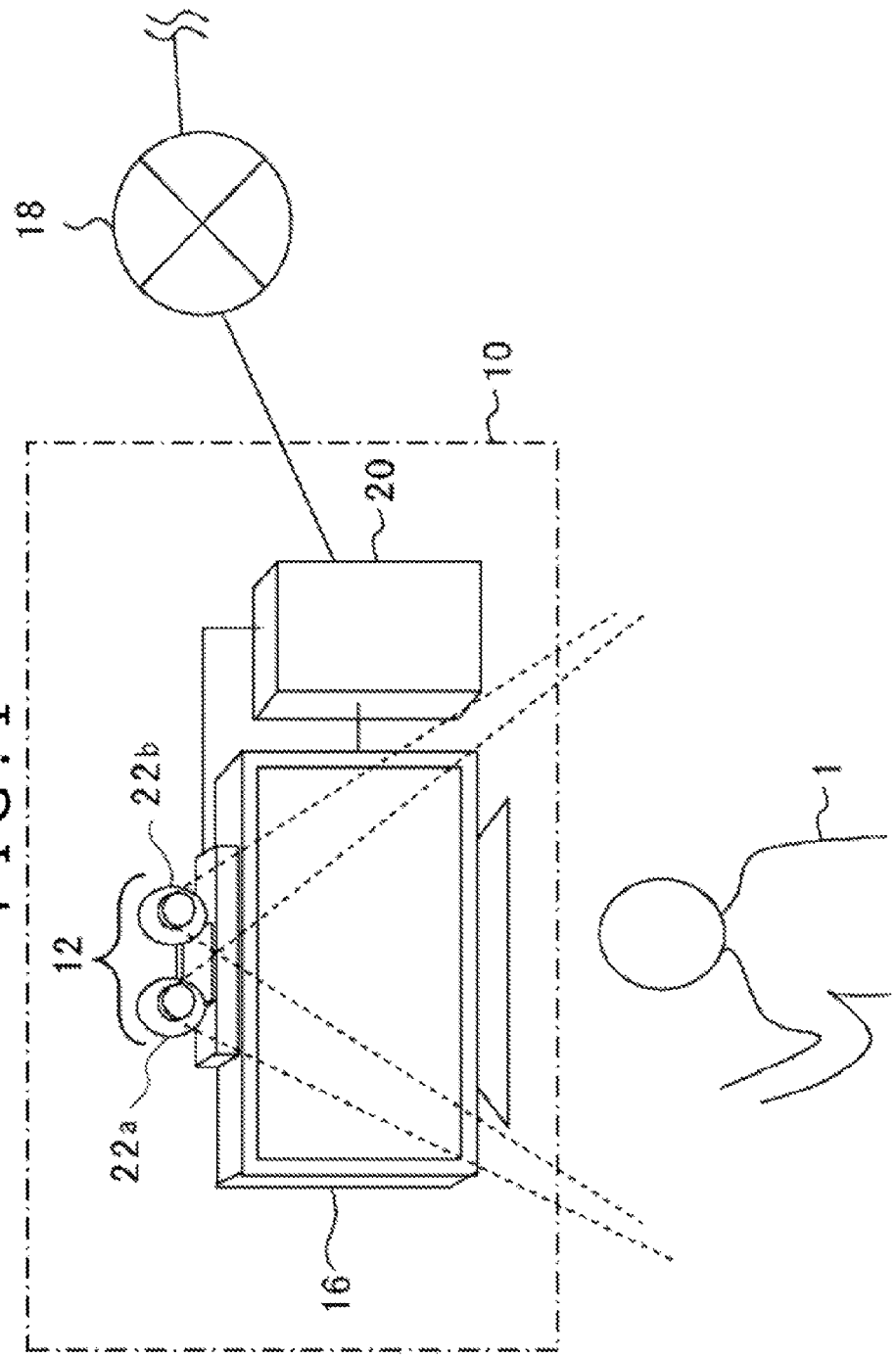
FIG. 1 is a schematic view depicting an example of a configuration of an information processing system to which an embodiment of the present technology can be applied.

FIG. 1 depicts an example of a configuration of an information processing system to which an embodiment of the present technology can be applied. Referring to FIG. 1, the information processing system 10 includes an image pickup apparatus 12, a host terminal 20, and a display apparatus 16. The image pickup apparatus 12 incorporates two cameras for picking up an image of an image pickup object such as a user 1. The host terminal 20 carries out information processing in accordance with a request of the user based on images picked up by the image pickup apparatus 12. The display apparatus 16 outputs image data obtained by the processing by the host terminal 20. The host terminal 20 can be connected to a network 18 such as the Internet.

The host terminal 20, image pickup apparatus 12, display apparatus 16, and network 18 may be connected to each other by a wire cable or may be connected by wireless connection by a wireless LAN (Local Area Network) or the like. Two or all of the image pickup apparatus 12, host terminal 20, and display apparatus 16 may be combined into and equipped as a unitary member. The image pickup apparatus 12 may not entirely be provided on the display apparatus 16, and the user 1 may not be a person and an arbitrary number of such users 1 may be involved.

The image pickup apparatus 12 is configured such that two cameras including a first camera 22a and a second camera 22b each including an image pickup element are disposed at left and right positions spaced by a known distance from each other. The image pickup element may be a visible light sensor used in general digital cameras and digital video cameras such as a CCD (Charge Coupled Device) sensor or a CMOS (Complementary Metal Oxide Semiconductor) sensor. Alternatively, a distance image sensor configured from a combination of an infrared light irradiation element and an infrared light sensor may be combined with a general visible light sensor. The two cameras pick up images of an image pickup object existing in the same space from the left and right positions at an equal frame rate or different frame rates. The image pickup apparatus 12 further produces a plurality of kinds of image data using the picked up images.

Data of images picked up and produced by the image pickup apparatus 12 are transmitted in such a stream format as hereinafter described to the host terminal 20. The host terminal 20 carries out necessary information processing using the image data transmitted thereto to produce an output image. The contents of the processing carried out by the host terminal 20 here are not limited especially but are set suitably depending upon a function requested by the user, the contents of the application or the like.

For example, when a game in which a character on whom a behavior of the user 1 who is an image pickup object is reflected appears, information processing for converting a behavior of the user 1 into a command input or the like is to be carried out, the host terminal 20 uses left and right images at the same timing acquired from the image pickup apparatus 12 to carry out stereo matching. Then, the host terminal 20 specifies position coordinates of the image pickup object in a three-dimensional space having a height, a width, and a depth with respect to the field of view of the cameras at a predetermined rate to acquire a time variation of the position coordinates. Then, the host terminal 20 carries out predetermined processing for the picked up images based on the acquired time variation or reflects the acquired time variation on an image prepared in advance to produce an output image.

Where a video chat application is applied, an image of the user 1 is transmitted on the real time basis to a chat partner through the network 18. At this time, the host terminal 20 may carry out a face detection process and then carry out such processing as to represent only the region of the face of the user 1 obtained by the face detection process in a high resolution. The host terminal 20 may synthesize a menu for executing various applications or an object image such as a cursor in addition to such image processing as just described. It is to be noted that, where only an application like a video chat which does not request information relating to the distance of an image pickup object from a camera is applied, the image pickup apparatus 12 may be configured from only one camera.

The display apparatus 16 displays a result of the processing carried out by the host terminal 20 as an image thereon as occasion demands. The display apparatus 16 may be a television set including a display unit that outputs an image and a speaker that outputs sound and may be, for example, a liquid crystal television set, a plasma television set, or a PC (Personal Computer) display unit.

As described above, in the information processing system 10, various processes may be carried out using moving images picked up by the image pickup apparatus 12, and the contents of the processes are not limited specifically. In the present embodiment, whichever process is carried out, the image pickup apparatus 12 not only carries out image pickup of moving images but also uses the moving pictures to produce a plurality of kinds of image data. Then, the image pickup apparatus 12 efficiently transmits only image data designated by the host terminal 20. Consequently, the information processing system is implemented which exhibits reduced latency from image pickup to image display and besides can carry out advanced processing.

Figure 2:
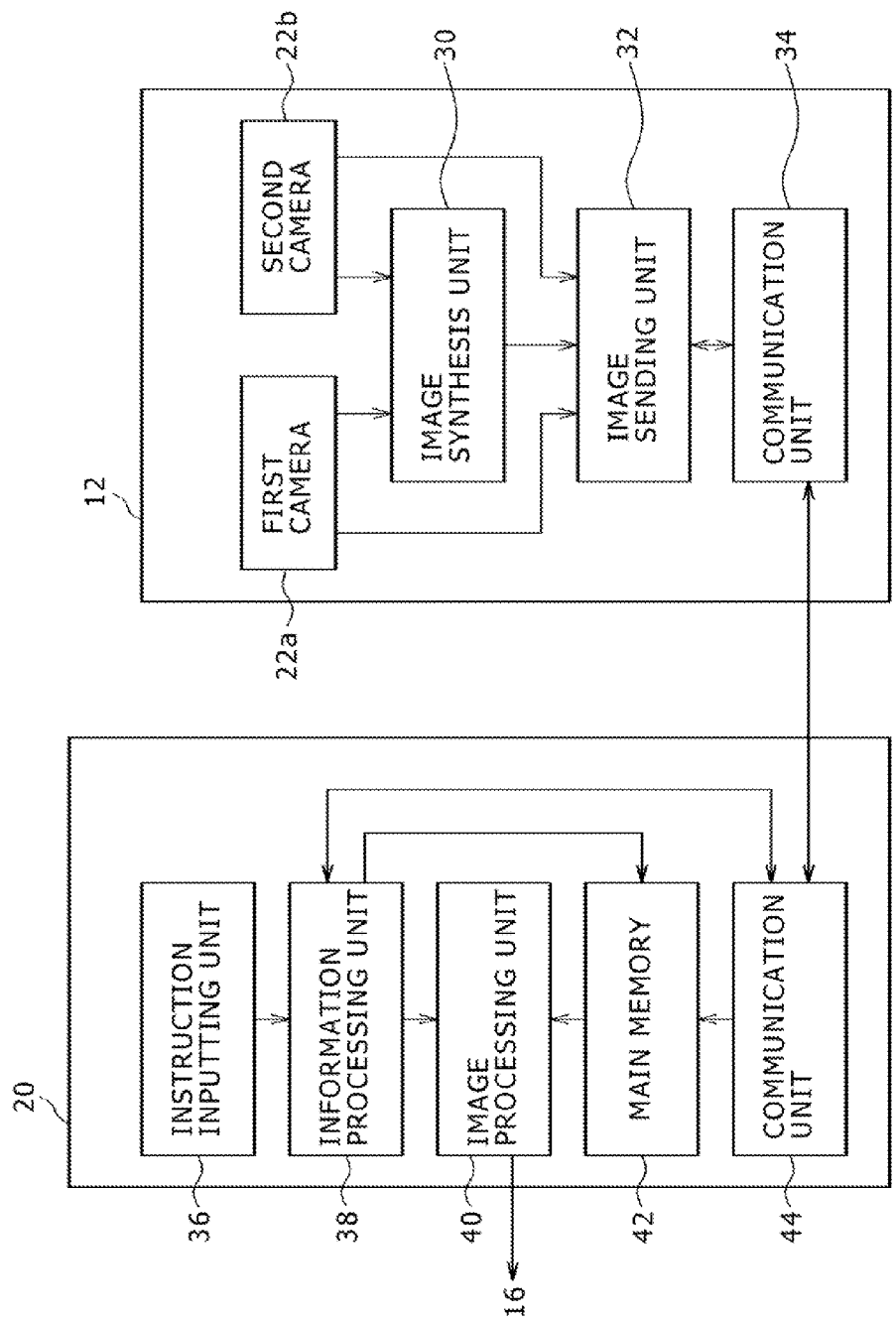
FIG. 2 is a block diagram depicting a configuration of a host terminal and an image pickup apparatus of the information processing system of FIG. 1.

FIG. 2 depicts a configuration of the host terminal 20 and the image pickup apparatus 12. Functional blocks depicted in FIG. 2 and FIGS. 3 to 5, 13, and 15 hereinafter referred to can be implemented from hardware or software. Where the functional blocks are configured from hardware, they can be configured from such components as a CPU (Central Processing Unit), a RAM (Random Access Memory), a ROM (Read Only Memory), a rendering circuit, an image pickup element and so forth. Where the functional blocks are configured from software, they may be implemented by a program loaded from a recording medium or the like into a memory and providing various functions such as a data inputting function, a data retaining function, an image analysis function, a rendering function, and a communication function. Accordingly, it can be recognized by those skilled in the art that the functional blocks can be implemented in various forms only from hardware, only from software or from a combination of hardware and software and are not limited to one of them.

The host terminal 20 includes an instruction inputting unit 36, an information processing unit 38, an image processing unit 40, a main memory 42, and a communication unit 44. The instruction inputting unit 36 acquires an instruction input from the user. The information processing unit 38 totally controls the host terminal 20 and the image pickup apparatus 12 to carry out information processing in accordance with an object. The image processing unit 40 produces an output image. The main memory 42 stores image data from the image pickup apparatus 12. The communication unit 44 is an interface that carries out requesting for and acquisition of image data to and from the image pickup apparatus 12.

The instruction inputting unit 36 accepts an instruction input from the user and produces and transmits a process requesting signal corresponding to the instruction input to the information processing unit 38. The instruction inputting unit 36 is implemented by cooperation of a general inputting apparatus such as a button, a keyboard, a mouse, a track ball and/or a touch panel, and a processor that interprets the substance of an operation carried out for the inputting apparatus to produce a process requesting signal, and so forth.

The information processing unit 38 issues a request for image data to the image pickup apparatus 12, a request for image processing to the image processing unit 40 and so forth in accordance with a process requesting signal acquired from the instruction inputting unit 36. Further, the information processing unit 38 develops image data transmitted thereto from the image pickup apparatus 12 in the main memory 42 as hereinafter described in detail. Furthermore, depending upon the substance of a process executed by the information processing system 10, the information processing unit 38 uses image data transmitted thereto from the image pickup apparatus 12 to carry out an image analysis such as stereo matching, tracking of an image pickup object, face detection, gesture detection and the like. Such image analysis can be implemented by applying a general technology.

The image processing unit 40 uses an image developed in the main memory 42 to carry out image processing in accordance with a request from the information processing unit 38 to produce a display image. The produced display image is stored into a frame memory not shown, and such stored displayed images are successively displayed on the display apparatus 16 under the control of the information processing unit 38. The communication unit 44 acquires a requesting signal for image data to the image pickup apparatus 12 produced by the information processing unit 38 and transmits the requesting signal to the image pickup apparatus 12. Further, the communication unit 44 acquires image data transmitted thereto from the image pickup apparatus 12 in accordance with the requesting signal and sends the acquired image data to the information processing unit 38.

The image pickup apparatus 12 includes the first camera 22a and the second camera 22b, an image synthesis unit 30, an image sending unit 32, and a communication unit 34. The first camera 22a and the second camera 22b pick up moving pictures to produce a plurality of kinds of image data. The image synthesis unit 30 integrates a plurality of kinds of image data. The image sending unit 32 extracts image data requested by the host terminal 20 and produces image data for transmission. The communication unit 34 is an interface that carries out reception of a requesting signal for image data from the host terminal 20 and transmission of image data.

The first camera 22a and the second camera 22b pick up moving pictures of the same image pickup object from the left and right points of view. The first camera 22a and the second camera 22b reduce the picked up frame images stepwise to produce a plurality of image data of different resolutions. The image synthesis unit 30 integrates the image data produced by the first camera 22a and the second camera 22b to produce such a virtual synthetic image as hereinafter described.

The image sending unit 32 extracts, from a virtual synthetic image produced by the image synthesis unit 30, image data requested by the host terminal 20. In particular, the image sending unit 32 accepts a region designation in a virtual synthetic image from the host terminal 20 and carries out a general cropping process to cut out a region. This makes it possible for the host terminal 20 to designate not only a kind of an image but also a local area of the image so that only the pertaining data can be received. Depending upon a communication method between the host terminal 20 and the image pickup apparatus 12, image data extracted by the image sending unit 32 are suitably packetized.

The communication unit 34 accepts a requesting signal for image data from the host terminal 20 and notifies the image sending unit 32 of the requesting signal. Further, the communication unit 34 transmits image data for transmission produced by the image sending unit 32 to the host terminal 20. The communication unit 34 sends packets to the host terminal 20 in accordance with a predetermined protocol such as, for example, USB 1.0/2.0/3.0. The communication with the host terminal 20 is not limited to wire communication but may be wireless LAN communication such as, for example, IEEE802.11a/b/g or infrared communication such as IrDA (Infrared Data Association).

Processes to be executed by the image pickup apparatus 12 in the present embodiment are carried out basically in a unit of a pixel string for one horizontal line of an image and is supplied in the unit to a succeeding functional block. As a result, each functional block of the image pickup apparatus 12 may include only a minimal line buffer as a memory to be provided therein, and processes from image pickup to transmission of image data to the host terminal 20 can be carried out with low latency.

Figure 3:
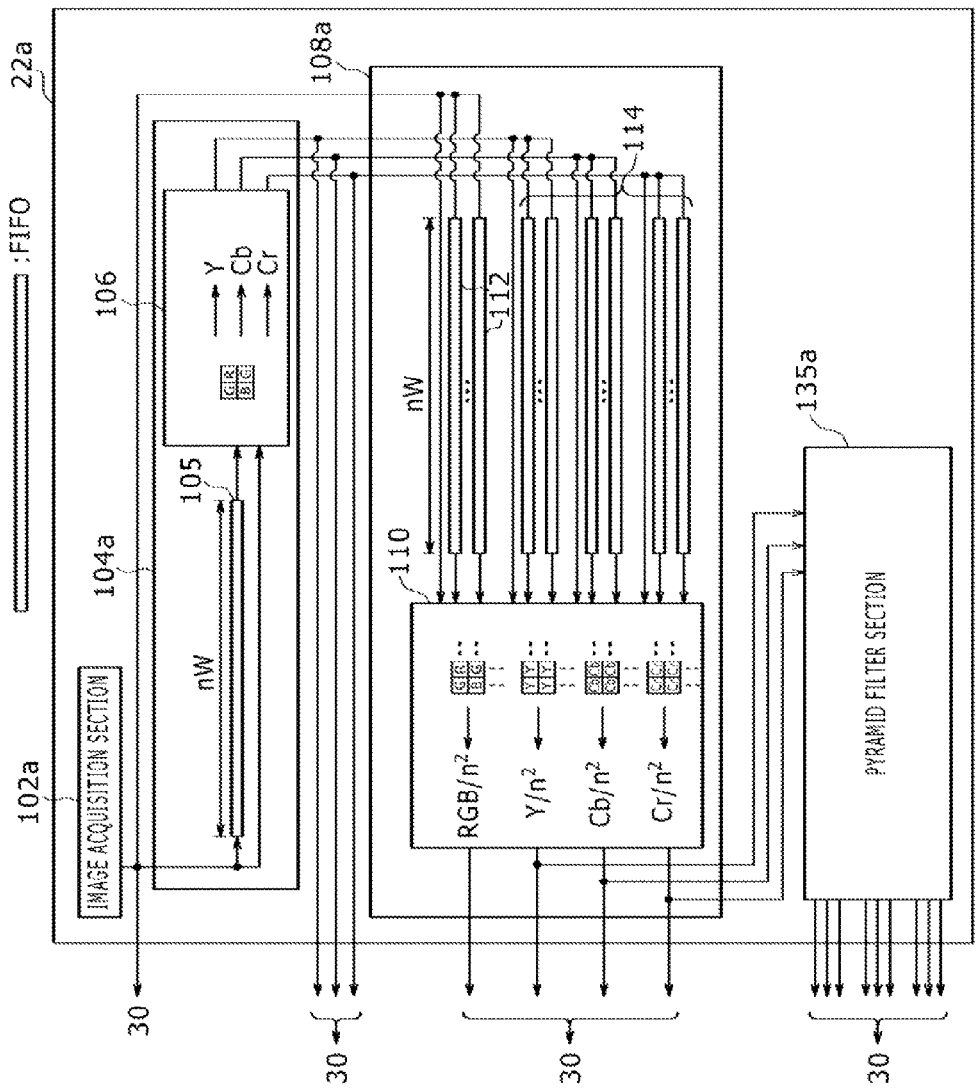
FIG. 3 is a block diagram particularly depicting a configuration of a first camera of the image pickup apparatus shown in FIG. 2.

FIG. 3 particularly depicts a configuration of the first camera 22a of the image pickup apparatus 12. It is to be noted that also the second camera 22b may have the same configuration. Alternatively, for a kind of images for which it is apparent that left and right stereo images are not required, the production function therefor may be excluded from the second camera 22b. The first camera 22a includes an image acquisition section 102a, a demosaic section 104a, a size adjustment section 108a, and a pyramid filter section 135a. The image acquisition section 102a reads out an image picked up by exposure by the image pickup element at a predetermined frame rate. This image is a RAW image.

The image acquisition section 102a sends, every time exposure of a pixel string for one horizontal line of a RAW image, the image of the pixel string to the demosaic section 104a and the image synthesis unit 30. In the present embodiment, the image acquisition section 102a can transmit data requested by the host terminal 20 in low latency through a similar configuration and a similar processing procedure without depending upon the resolution of the camera. Consequently, even if the performance of the image pickup element or the process to be carried out by the host terminal 20 is expanded in future, it is possible to cope with the future expansion without significantly modifying the system configuration while traditional processes can carried out similarly. As a result, high expandability can be implemented at a low cost.

It is to be noted that, in the following description, it is assumed that, where n is a natural number, a RAW image to be acquired by the image acquisition section 102a has a width of nW pixels in the horizontal direction and a height of nH pixels in the vertical or heightwise direction. This is because it is intended to determine an image prior to reduction to be inputted to the pyramid filter section 135a hereinafter described and having a number W of pixels in the horizontal direction and another number H of pixels in the vertical direction as a reference image. Most simply, n may be set to n=1 and the pyramid filter section 135a may be prepared in accordance with the size of a RAW image which depends upon the resolution of the camera.

On the other hand, in the present embodiment, it is made possible for the configuration of the pyramid filter section 135a to be used as it is in whatever manner the resolution of the camera varies due to technological innovations and so forth thereby to enhance the expandability and make it possible to carry out various processes in a similar manner irrespective of the resolution. Accordingly, the natural number n is determined in response to the resolution of a camera to be introduced. Alternatively, a maximum value of n may be determined within a conceivable range, and the capacity and so forth of the buffer memory may be prepared in response to the maximum value of the natural number n. In this instance, the image acquisition section 102a determines an actual value of n from the image pickup element connected thereto and notifies the other blocks of the actual value of n so that the value of n may be reflected on the contents of processing or a range of use of the buffer memory may be determined.

The demosaic section 104a includes a FIFO (First In First Out) buffer 105 having a capacity for nW pixels and a simple demosaic processing portion 106. Pixel data for one horizontal line of a RAW image are inputted to and retained by the FIFO buffer 105 until pixel data for next one horizontal line are inputted to the demosaic section 104a. When the simple demosaic processing portion 106 receives pixel data for two horizontal lines, it uses the pixel data to execute a demosaic process of completing, for each pixel, color information based on surrounding pixels thereby to create a full color image.

As well known to those skilled in the art, a large number of methods are available for this demosaic process. Here, a simple demosaic process in which only pixels for two horizontal lines are used can be used satisfactorily. As an example, if a pixel with regard to which corresponding YCbCr values are to be calculated only has a G value, the R value of the pixel is calculated as an average of the R values of the left and right neighboring pixels; the G value of the pixel is determined using the G value as it is; and the B value of the pixel is determined using the B value of a pixel positioned at the upper side or lower side of the pixel. Then, the R, G, and B values are used and substituted into a predetermined conversion expression to calculate YCbCr values. Since such a demosaic process is well known in the art, more detailed description is omitted herein. It is to be noted that the color space of image data produced by processing of the demosaic section 104a and a succeeding block is not limited to the YCbCr space.

The reason why a simple demosaic process can be used satisfactorily is that, where an image of high quality is required, the RAW image can be used. As a modification to the simple demosaic process, a method of configuring YCbCr values of one pixel from four RGB pixels may be used. In this case, since a demosaic image having a 1/4 size of the RAW image is obtained, a first filter 137a of the pyramid filter section 135a hereinafter described can be eliminated.

The simple demosaic processing portion 106 converts, for example, four RGB pixels of 2×2 into YCbCr color signals for four pixels as depicted in FIG. 3 and transmits the YCbCr color signals to the image synthesis unit 30 and the size adjustment section 108a. The simple demosaic processing portion 106 repeats this process for the entire RAW image inputted thereto to produce a demosaic image having widths of nW pixels in the horizontal direction and nH pixels in the vertical direction with respect to the one RAW image. This image has a size obtained when an image as a reference having W pixels in the horizontal direction and H pixels in the vertical direction is multiplied by n in both of the horizontal and vertical directions. Therefore, the image is hereinafter referred to as $n^2/1$ demosaic image.

The size adjustment section 108a reduces a RAW image acquired by the image acquisition section 102a and an $n^2/1$ demosaic image produced by the demosaic section 104a to 1/n time in both of the horizontal and vertical directions to produce images of the reference image size. To this end, the size adjustment section 108a includes FIFO buffers 112 and 114 having a capacity for nW pixels and a reduction processing portion 110. The FIFO buffer 112 is configured from one or a plurality of FIFO buffers each for retaining image data for one horizontal line of a RAW image. The FIFO buffers have a role of retaining, until after pixel data of the last row from among a predetermined number of rows necessary for a single time reduction process are inputted thereto from the image acquisition section 102a, image data of some other row or rows.

The reduction processing portion 110 uses, at a point of time at which pixel data of the RAW image for the predetermined number of rows are inputted thereto from the image acquisition section 102a, the inputted pixel data to carry out a reduction process. A generally used method such as linear interpolation can be used for the reduction process. The number of FIFO buffers which configure the FIFO buffer 112 is determined in accordance with an applied method for the reduction process. For example, where an average value of pixel values for each of a block of n×n pixels is used as one pixel value, in order to produce one row of a reduced image, pixel data for n rows are required. Therefore, the number of FIFO buffers is n−1. While, in the example of FIG. 3, more than two FIFO buffers are shown, one FIFO buffer may be used for reduction to ½ time.

Also the FIFO buffer 114 is configured similarly from one or a plurality of FIFO buffers for individually retaining image data for one horizontal line of an $n^2/1$ demosaic image individually corresponding to Y, Cb, and Cr signals. The reduction processing portion 110 uses, at a point of time at which image data of an $n^2/1$ demosaic image for the predetermined number of rows are inputted thereto from the demosaic section 104a, the inputted image data to carry out a reduction process similar to that described hereinabove.

As a result of the reduction process, the reduction processing portion 110 outputs image data of the reduced RAW image and the Y, Cb, and Cr images after the reduction, which have the widths of W pixels in the horizontal direction and H pixels in the vertical direction, for each one row. The size adjustment section 108a successively transmits the data to the image synthesis unit 30 and transmits the data of the Y, Cb, and Cr images also to the pyramid filter section 135a. Since the Y, Cb, and Cr images at this time have the reference size, each of them is hereinafter referred to as 1/1 demosaic image. It is to be noted that, where n=1 is satisfied depending upon the resolution of the camera, the reduction process by the size adjustment section 108a may be omitted. The pyramid filter section 135a has a function for hierarchizing a certain image into a plurality of resolutions and outputting resulting images of the resolutions. The pixel data of the Y, Cb, and Cr images of the resolutions produced by the pyramid filter section 135a are transmitted for each one row to the image synthesis unit 30.

FIG. 4 depicts details of the pyramid filter section 135a. The pyramid filter section 135a basically includes a number of 1/4 reduction filters corresponding to required resolution levels. In FIG. 4, the pyramid filter section 135a includes filters of three hierarchies including a first filter 137a, a second filter 141a, and a third filter 145a. Each filter executes a process of bilinearly interpolating four pixels neighboring with each other to arithmetically operate an average pixel value of the four pixels. Accordingly, the image size after the process is 1/4 that of the images before the process. It is to be noted that it can be recognized easily that the present embodiment can be implemented similarly even if the number of filters is other than filters of three hierarchies.

At the preceding stage to the first filter 137a, a FIFO buffer 139 for W pixels is disposed corresponding to each of the Y, Cb, and Cr signals. The FIFO buffers 139 have a role of retaining YCbCr image data for one horizontal line until image data for a next horizontal line are inputted thereto from the size adjustment section 108a. After image data for two horizontal lines are inputted, the first filter 137a averages the Y, Cb, and Cr pixel values for four pixels of 2×2. By repeating this sequence of processes, the 1/1 demosaic image having a length reduced to 1/2 in both of the horizontal and vertical directions is obtained. As a result, the size is converted into 1/4 as a whole. The 1/4 demosaic image obtained by the conversion is sent to the image synthesis unit 30 and passed to the second filter 141a at the succeeding stage.

At the preceding stage to the second filter 141a, one FIFO buffer 143 for W/2 pixels is disposed corresponding to each of the Y, Cb, and Cr signals. Also the FIFO buffers 143 have a role of retaining YCbCr pixel data for one horizontal line until pixel data for a next horizontal line are inputted thereto from the first filter 137a. After pixel data for two horizontal lines are inputted, the second filter 141a averages the Y, Cb, and Cr pixel values for four pixels of 2×2. By repeating this sequence of processes, a 1/4 demosaic image having a length reduced to 1/2 in both of the horizontal and vertical directions is obtained. As a result, the size is converted into 1/16 as a whole. The 1/16 demosaic image obtained by the conversion is sent to the image synthesis unit 30 and passed to the third filter 145a at the succeeding stage.

Also the third filter 145a repeats a sequence of processes similar to that described above although a FIFO buffer 147 for W/4 pixels is disposed at the preceding stage thereto. The third filter 145a outputs 1/64 demosaic images to the image synthesis unit 30. It is to be noted that such a pyramid filter as described above is disclosed in Patent Document 1 and therefore is known, and therefore, more detailed description of the pyramid filter section is omitted herein.

In this manner, image data successively reduced by 1/4 are inputted from the filters of the pyramid filter section 135a to the image synthesis unit 30. As can be recognized from this, as image data successively pass the filters in the pyramid filter section 135a, the FIFO buffers required at the preceding stages to the filters may have a smaller capacity. It is to be noted that the numbers of the filters at the individual stages are not limited to three but may be determined suitably in accordance with a desired width of the resolution.

Also the second camera 22b of the image pickup apparatus 12 has a structure basically same as that of the first camera 22a, and therefore, illustration of the structure of the first camera 22a is omitted in the drawings. However, in the following description, the image acquisition section, demosaic section, pyramid filter section, first filter, second filter, and third filter of the second camera 22b are referred to as image acquisition section 102b, demosaic section 104b, size adjustment section 108b, pyramid filter section 135b, first filter 137b, second filter 141b, and third filter 145b, respectively, with corresponding reference characters added thereto.

Figure 5:
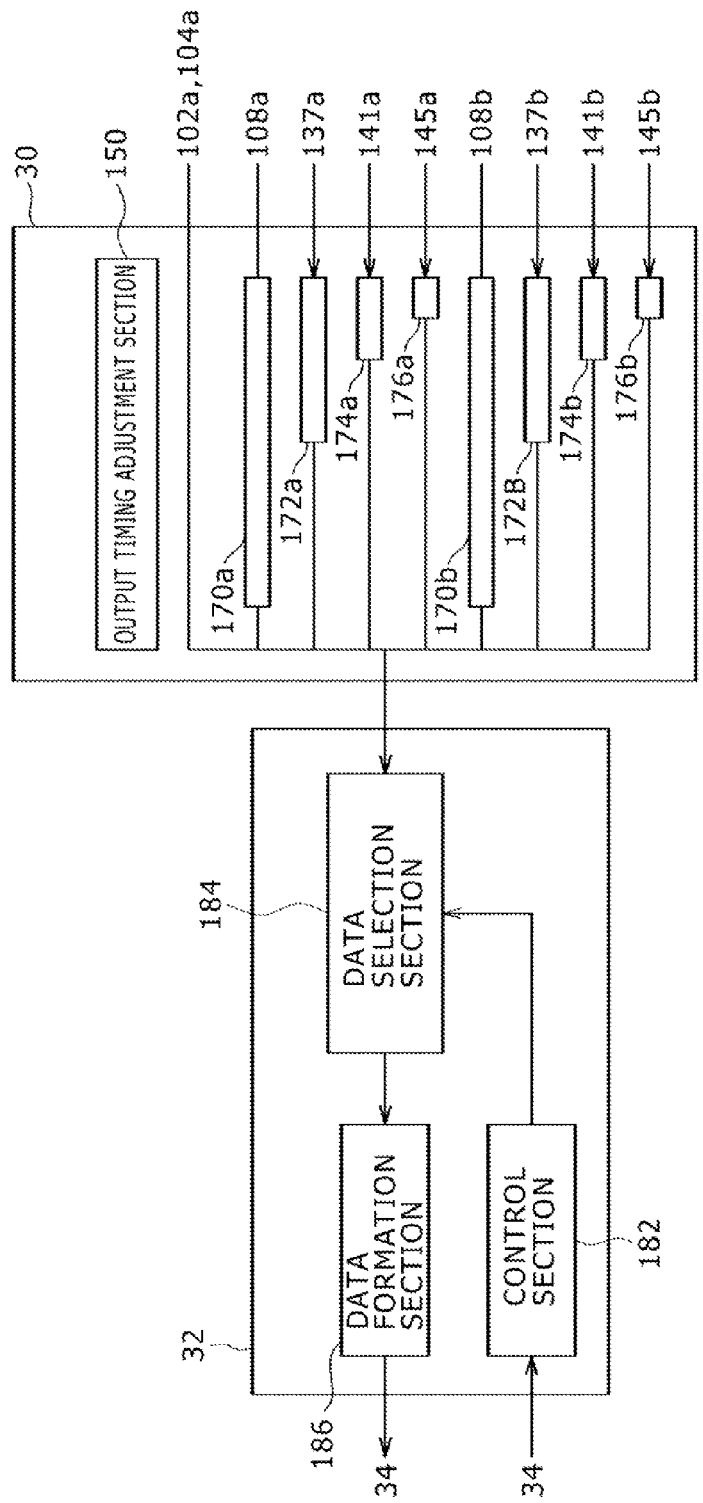
FIG. 5 is a block diagram particularly depicting a configuration of an image synthesis unit and an image sending unit of the image pickup apparatus of FIG. 2.

FIG. 5 particularly depicts a configuration of the image synthesis unit 30 and the image sending unit 32. Referring to FIG. 5, the image synthesis unit 30 includes an output timing adjustment section 150 for adjusting the output timing of image data of each size sent thereto from the first camera 22a and the second camera 22b to the image sending unit 32. The image synthesis unit 30 further includes FIFO buffers 170a, 172a, 174a, 176a, 170b, 172b, 174b, and 176b for the output timing adjustment. It is to be noted that, although, in FIGS. 3 and 4, Y, Cb, and Cr data are represented individually and arrow marks for data inputting and outputting are indicated corresponding to them, in FIG. 5 and the succeeding figures, the factors are treated as one set and indicated by one arrow mark in order to simplify illustration.

The FIFO buffer 170a retains pixel values for one horizontal line of a reduced RAW image or a 1/1 demosaic image sent thereto from the size adjustment section 108a of the first camera 22a. The FIFO buffers 172a, 174a, and 176a retain YCbCr pixel values for one horizontal line of a 1/4 demosaic image, a 1/16 demosaic image, and a 1/64 demosaic image sent thereto from the first filter 137a, second filter 141a, and third filter 145a of the first camera 22a, respectively. Accordingly, the FIFO buffers 170a, 172a, 174a, and 176a retain W, W/2, W/4 and W/8 pixel values, respectively.

The FIFO buffer 170b retains pixel values for one horizontal line of a reduced RAW image or a 1/1 demosaic image sent thereto from the size adjustment section 108b of the second camera 22b. The FIFO buffers 172b, 174b, and 176b retain YCbCr pixel values for one horizontal line of a 1/4 demosaic image, a 1/16 demosaic image, and a 1/64 demosaic image sent thereto from the first filter 137b, second filter 141b, and third filter 145b of the second camera 22b, respectively. Accordingly, the FIFO buffers 170b, 172b, 174b, and 176b retain W, W/2, W/4, and W/8 pixel values, respectively.

The output timing adjustment section 150 successively outputs pixel data for n rows of a RAW image sent thereto from the image acquisition section 102a of the first camera 22a or an $n^2/1$ demosaic image sent thereto from the demosaic section 104a for each row to the image sending unit 32. Thereafter, the output timing adjustment section 150 outputs image data for one row of the reduced RAW image or the 1/1 demosaic image of the first camera 22a stored in the FIFO buffer 170a and pixel data for one row of the reduced RAW image or the 1/1 demosaic image of the second camera 22b stored in the FIFO buffer 170b in this order.

Thereafter, the output timing adjustment section 150 successively outputs pixel data for one row or within a range smaller than one row of 1/4 and higher reduction rate demosaic images in accordance with such a rule as hereinafter described in detail. It is to be noted that, depending upon an input timing of the RAW image or the $n^2/1$ demosaic image to the image synthesis unit 30 or an output timing of such an image to the image sending unit 32, additional FIFO buffers for storing the images may be provided.

In this manner, the output timing adjustment section 150 adjusts the output timings so as to produce a new pixel row in which pixel data for n rows of the RAW image or the $n^2/1$ demosaic image, for one row of the left and right reduced RAW images or 1/1 demosaic images or for one row or part of one row of the left and right 1/4 demosaic images, 1/16 demosaic images, and 1/64 demosaic images are connected cyclically. As described hereinabove, processing carried out by the image pickup apparatus 12 in the present embodiment is executed in a raster order in which processing from the left to the right is repeated in a downward direction of an image from a start point at the left upper corner of the image. In this instance, pixels for one horizontal line (one row) are a basic processing unit. Inputting and outputting of pixel data from the cameras up to the image sending unit 32 and transmission of image data to the host terminal 20 are carried out basically in a stream format in which pixel data for each one row of an image are connected in order beginning with the top row.

Also data outputted from the image synthesis unit 30 have a form of a stream of a series of pixel values in which data of various images acquired and produced by the first camera 22a and the second camera 22b are mixed. Accordingly, strictly speaking, a synthetic image is not produced as an image on a two-dimensional plane. However, as hereinafter described in detail, if the number of pixels when the connection of the images makes one round with regard to a stream outputted from the image synthesis unit 30 is defined as a horizontal width of a synthetic image, then the stream can be subjected to later processing as an image having such a width as just described.

As a result, the image synthesis unit 30 produces an image synthesized from a RAW image or an $n^2/1$ demosaic image, left and right reduced RAW images or 1/1 demosaic images, left and right 1/4 demosaic images, left and right 1/16 demosaic image images, and left and right 1/64 demosaic images. Such a virtual image as just described is hereinafter referred to as "synthetic image."

It is to be noted that, in FIG. 5, it is assumed that one of a RAW image which can be inputted from the image acquisition section 102a of the first camera 22a and an $n^2/1$ demosaic image which can be inputted from the demosaic section 104a is selectively included in a synthetic image. Similarly, it is assumed that a reduced RAW image and a 1/1 demosaic image which can be inputted from the size adjustment sections 108a and 108b of the cameras is selectively included in a synthetic image. Therefore, only one input line for each of them is depicted. This is because, also upon use for display on the host terminal 20 or the like, in many cases, it is sufficient if one of a RAW image and an $n^2/1$ demosaic image or one of a reduced RAW image and a 1/1 demosaic image is available.

Which one of images should be selected may be determined in accordance with a request from the host terminal 20 or may otherwise be fixed. In the former case, a multiplexer or a like circuit may be provided at the output side of the camera or at the input side of the image synthesis unit 30 such that a control section 182 of the image sending unit 32 or the like carries out changeover control of the multiplexer or the like in accordance with a request from the host terminal 20. Alternatively, all data may be included in the synthetic image such that a data selection section 184 of the image sending unit 32 hereinafter described carries out the selection. Similarly, it is assumed that an image of a high resolution such as a RAW image or an $n^2/1$ demosaic image is used only for display and does not in most cases require left and right images. Therefore, in the example of FIG. 5, such images are inputted only from the first camera 22a. As occasion demands, a RAW image or a $n^2/1$ demosaic image may be acquired from both cameras.

The image sending unit 32 includes a control section 182, a data selection section 184, and a data formation section 186. The control section 182 instructs the data selection section 184 of a region to be sent out from within a synthetic image based on a requesting signal from the host terminal 20. The control section 182 further receives a signal for requesting starting or ending of image pickup, a signal for designating an image pickup condition and so forth from the host terminal 20. Then, the control section 182 provides the information suitably to the image acquisition sections 102a and 102b of the first camera 22a and the second camera 22b and so forth to control an image pickup process. However, since a general technology can be applied to the control, detailed description of the control is omitted herein.

The data selection section 184 accepts data of a pixel string of a synthetic image inputted from the image synthesis unit 30 as input data, selectively extracts pixel data based on the instruction from the control section 182 and sends the pixel data to the data formation section 186. If the host terminal 20 requests for all data included in the synthetic image, then the data selection section 184 inputs all of pixel data for every one row of the synthetic image successively inputted thereto from the image synthesis unit 30 to the data formation section 186. If the host terminal 20 requests for only part of such data, then the data selection section 184 carries out cutout of a region corresponding to the requested data from the synthetic image. Then, the data selection section 184 connects such data of the cut out pixel strings to re-construct a stream and sends the stream to the data formation section 186.

The data formation section 186 converts the format of the stream inputted thereto from the data selection section 184 into a format conforming to a communication protocol with the host terminal 20 so that the stream has a data format with which it can be sent out. Then, the communication unit 34 transmits the steam of the data format to the host terminal 20. For example, the data formation section 186 converts the stream into a packet for each size of an end point of the USB and writes such packets into an internal packet buffer (not shown). Then, the communication unit 34 successively transfers the packets in the packet buffer to the host terminal 20.

Figure 6:
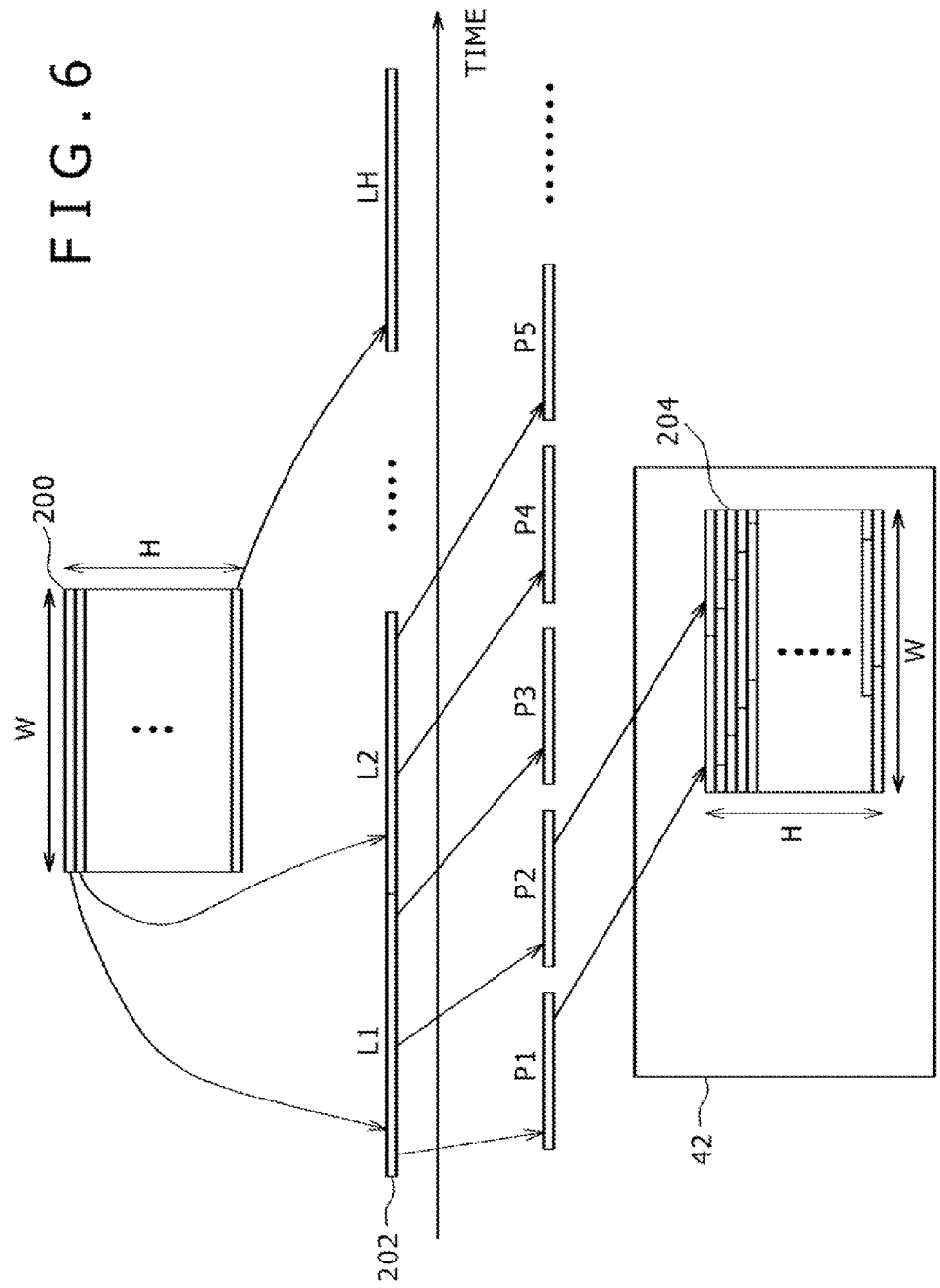
FIG. 6 is a diagrammatic view schematically illustrating a basic transition of the form of data in the image pickup apparatus and the host terminal of FIG. 2.

FIG. 6 schematically illustrates a basic transition of the form of data in the image pickup apparatus 12 and the host terminal 20. Here, as the simplest example, transmission of data of an entire frame image 200 having widths of W pixels in the horizontal direction and H pixels in the vertical direction from the image pickup apparatus 12 to the host terminal 20 is described. As described hereinabove, production, selection, and transmission of image data are carried out in a raster order of pixels, and pixel data for one row are successively connected to form a stream to be used for processing.

Data outputted from the data selection section 184 in such a situation as described above correspond to a stream 202. In FIG. 6, the axis of abscissa of the stream 202 represents lapse of time, and rectangles L1, L2, ..., LH that configure the stream 202 represent data of pixels in the first row, second row, ..., Hth row of the frame image 200, respectively. If the data size of one pixel is d bytes, then the data size of each rectangle is W×d bytes.

The data formation section 186 packetizes the stream 202 for each predetermined size to produce packets P1, P2, P3, P4, P5, .... Consequently, the data are transmitted in the order of the packets P1, P2, P3, P4, P5, ... from the image pickup apparatus 12 to the host terminal 20. The host terminal 20 receives the packets P1, P2, P3, P4, P5, ... through the communication unit 44 and stores the data of the packets into the main memory 42 under the control of the information processing unit 38.

At this time, the host terminal 20 arranges the data of the packets in the raster order into the main memory 42 so that they have a width corresponding to the pixel number W in the horizontal direction of the original frame image 200 and the data are developed to successive addresses of W×d×H bytes thereby to reproduce an image 204 corresponding to the frame image 200. In FIG. 6, rectangles that configure the image 204 represent the data of the packets. Depending upon the data size of the packets, image data included in one packet may span the tale of a row and the head of a next row of the image 204. The image processing unit 40 processes the image 204 developed in the main memory 42 or synthesizes the image 204 with a different image under the control of the information processing unit 38 to render an image to be displayed on the display apparatus 16.

Figure 7:
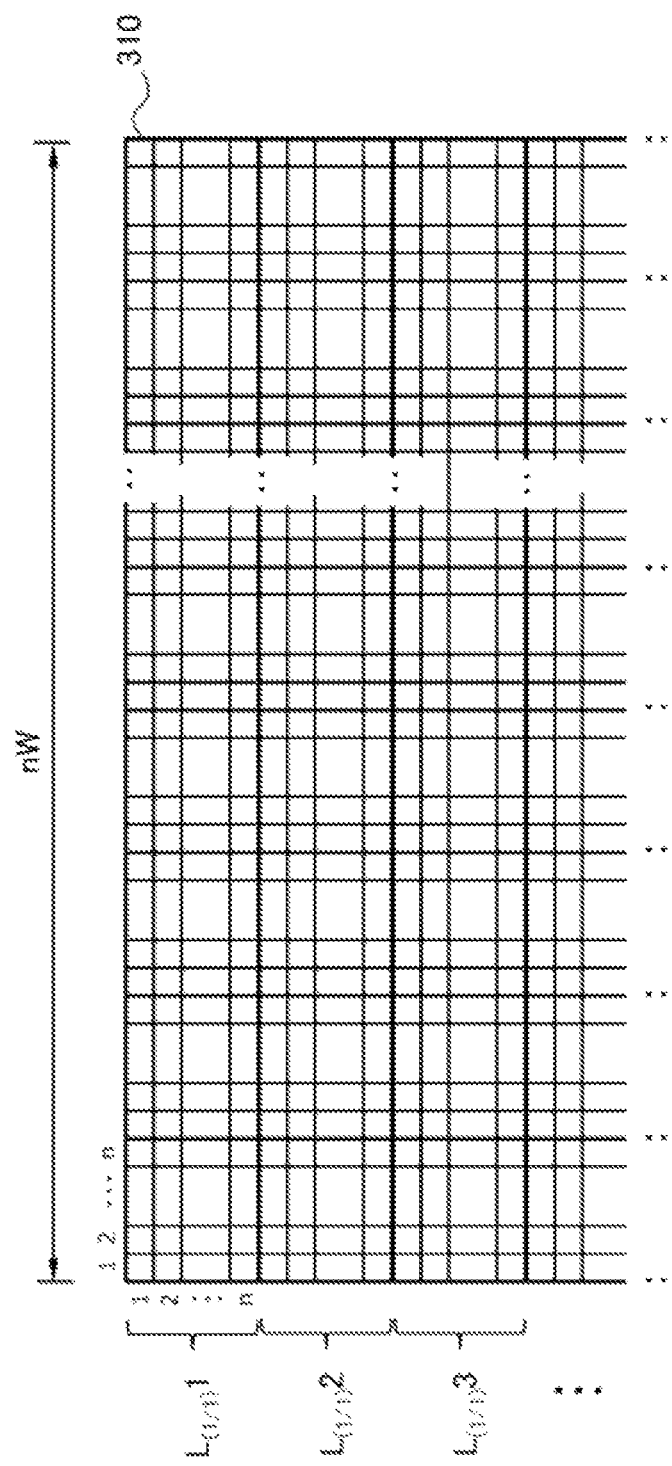
FIG. 7 is a diagrammatic view schematically illustrating a relationship between pixels before and after a reduction process of an image performed by a size adjustment section of the first camera depicted in FIG. 2.

FIG. 7 schematically illustrates a relationship between pixels before and after an image reduction process carried out by the size adjustment section 108a. An image 310 is a RAW image or an $n^2/1$ demosaic image and has widths of nW pixels in the horizontal direction and nH pixels in the vertical direction. A rectangle that is a minimum unit depicted in the inside of the image 310 is a pixel, and row numbers and column numbers from 1 to n are applied to n×n pixels at a left upper corner location of the image. Image data of such an image as just described are inputted, in the case of a RAW image, from the image acquisition section 102a, but in the case of a demosaic image, from the demosaic section 104a, to the size adjustment section 108a for each row.

The size adjustment section 108a retains image data of rows inputted previously in the FIFO buffers 112 and 114 until all of image data of a predetermined number of rows necessary for a reduction process are inputted completely. If it is tried to produce one pixel after reduction using a block of n×n pixels of the image 310, then at a point of time at which data of the nth row are inputted, the size adjustment section 108a reads out pixel data from the first to (n−1)th rows retained in the FIFO buffers. Then, the size adjustment section 108a calculates one pixel value by averaging pixel values for each block or by a like method. A rectangle defined by thick lines of the image 310 of FIG. 7 corresponds to one pixel of a reduced RAW image or a 1/1 demosaic image. This sequence of processes is repeated up to the end of the row of the image to produce pixel data for one row of a reduced RAW image or a 1/1 demosaic image.

Further, the sequence of processes is repeated in the vertical direction of the image 310 to produce the entirety of a reduced RAW image or a 1/1 demosaic image reduced to 1/n time in both of the horizontal and vertical directions. Every time the size adjustment section 108a produces pixel data for one row, it successively inputs the pixel data to the image synthesis unit 30 and the pyramid filter section 135a. The 1/1 demosaic images produced in this manner are hereinafter denoted by $L_{(1/1)}1, L_{(1/1)}2, L_{(1/1)}3, \ldots$ in order beginning with the first row. It is to be noted that a 1/1 demosaic image can be replaced by a reduced RAW image of the same size by later processing as described hereinabove.

Figure 8:
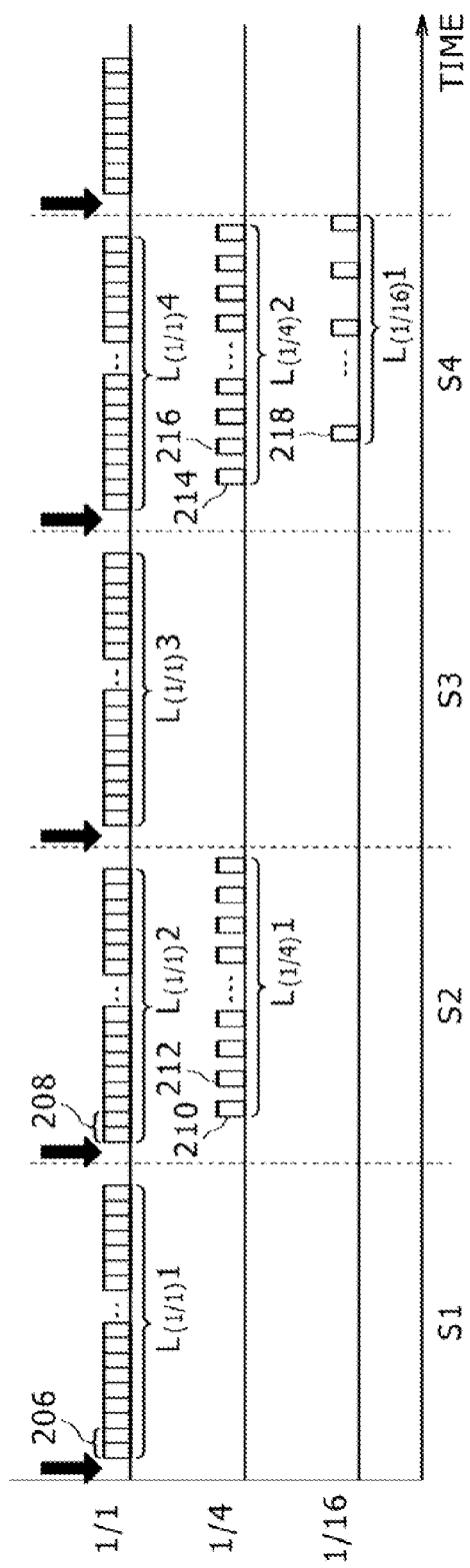
FIG. 8 is a time chart illustrating inputting timings of pixel data of a 1/4 demosaic image, a 1/16 demosaic image, and a 1/64 demosaic image to the image synthesis unit of FIG. 5.

FIG. 8 is a time chart illustrating timings at which pixel data of a 1/1 demosaic image, a 1/4 demosaic image, and a 1/16 demosaic image are inputted from the filters of the size adjustment section 108a and the pyramid filter section 135a to the image synthesis unit 30. It is to be noted that, while FIG. 8 depicts reduced images including a 1/16 demosaic image, even if a further reduced demosaic image or images are added, similar processing can be applied in principle. In FIG.

8, time steps S1, S2, S3, S4, . . . represent periods within which pixel data of the first row, second row, third row, fourth row, . . . of the 1/1 demosaic image are inputted to the image synthesis unit 30, respectively.

In the present embodiment, a period within which pixel data for one row of the 1/1 demosaic image are inputted is set as a reference time step, and the time step corresponds to one pixel string for one row of a synthetic image. It is to be noted that the size adjustment section 108a begins to produce, simultaneously when pixel data of an $n^2/1$ demosaic image for n−1 rows are stored into the FIFO buffers and then the $n^2/1$ demosaic image for the nth row is inputted, pixel data of a 1/1 demosaic image beginning with the top of the row.

Accordingly, within a period indicated by a thick arrow mark within each time step within which pixel data of each row of a 1/1 demosaic image are inputted, at least pixel data of an $n^2/1$ demosaic image for n−1 rows are inputted, and in FIG. 8, the time axis within the period is simplified. In any case, the time steps S1, S2, S3, S4, . . . correspond also to periods within which pixel data of the $n^2/1$ demosaic image are inputted for n rows. This similarly applies also where a RAW image is selected as input data.

Top, middle, and bottom stages of FIG. 8 indicate input timings of a 1/1 demosaic image, a 1/4 demosaic image, and a 1/16 demosaic image, respectively, and one rectangle corresponds to an input of one pixel. First, within the time step S1, pixel data of the pixel string $L_{(1/1)}1$ of the first line of the 1/1 demosaic image are inputted in order beginning with the pixel at the top of the row. Within this time step, since none of a 1/4 demosaic image and a 1/16 demosaic image is produced as yet, they are not inputted.

Within the next time step S2, pixel data of the pixel string $L_{(1/1)}2$ of the second line of the 1/1 demosaic image are inputted in order beginning with the top of the row. At this time, the pyramid filter section 135a uses the pixel data of the pixel string $L_{(1/1)}1$ of the first line and the pixel string $L_{(1/1)}2$ of the second line of the 1/1 demosaic image to produce a pixel string $L_{(1/4)}1$ of the first line of a 1/4 demosaic image. Therefore, within the time step S2, also the image data of the pixel line are inputted.

For example, a pixel value inputted within a period 210 at the left end of the pixel string $L_{(1/4)}1$ of the first line of the 1/4 demosaic image is produced using pixel values of two pixels inputted within a period 206 from within the pixel string $L_{(1/1)}1$ of the first line of the 1/1 demosaic image and pixel values of two pixels within a period 208 from within the pixel string $L_{(1/1)}2$ of the second line. Therefore, within the time step S2, the input timings of the pixel values of the pixel string $L_{(1/4)}1$ are delayed by a period of at least two pixels from the input timings of the pixel values of the corresponding pixels of the pixel string $L_{(1/1)}2$.

Within the next time step S3, pixel data of the pixel string $L_{(1/1)}3$ of the third line of the 1/1 demosaic image are inputted. Within this time step, pixel data for the second line of the 1/4 demosaic image are not produced and a 1/16 demosaic image is not produced as yet, and therefore, none of them is inputted. Within the next time step S4, namely, within a period within which pixel values of the pixel string $L_{(1/1)}4$ of the fourth line of the 1/1 demosaic image are inputted, also pixel data of the second pixel row $L_{(1/4)}2$ of the 1/4 demosaic image are inputted similarly as within the time step S2.

Further, the pyramid filter section 135a uses pixel data of the first pixel row $L_{(1/4)}1$ and the second pixel row $L_{(1/4)}2$ of the 1/4 demosaic image to produce a first pixel row $L_{(1/16)}1$ of a 1/16 demosaic image. Therefore, within the time step S4, also the pixel data of the pixel row are inputted. For example, pixel values inputted within a first input period 218 from within the pixel string $L_{(1/16)}1$ of the first line of the 1/16 demosaic image are produced using pixel values of two pixels inputted within the period 210 and another period 212 from within the pixel string $L_{(1/4)}1$ of the first line of the 1/4 demosaic image and pixel values of two pixels inputted within a period 214 and another period 216 from within the pixel string $L_{(1/4)}2$ of the second line of the 1/4 demosaic image.

Therefore, within the time step S4, the input timings of the pixel row $L_{(1/16)}1$ are delayed by a period of at least two pixels from the input timings of the pixel values of the corresponding pixels of the pixel string $L_{(1/4)}2$. Thereafter, inputting of the pixel data of the images is repeated similarly so that all pixel data of the 1/1 demosaic image, 1/4 demosaic image, and 1/16 demosaic image are inputted to the image synthesis unit 30.

In this manner, the pixel data of the images are inputted in a raster order as individual streams from the blocks of the second camera 22b and the filters of the first camera 22a. The image synthesis unit 30 connects the streams to produce a single stream and outputs the stream to the image sending unit 32. Most simply, the data of the pixel values may be connected in the order of inputting timings irrespective of the original image. In this case, the synthesis process itself is easy. However, it is necessary to classify and extract data for each one row for each image by later processing, and this complicates the processing.

It is another idea to put, within each time step, pixel data together for the individual images to produce pixel strings and connect the pixel strings in series. In this case, the size of data to be outputted varies by a great amount in the follow manner depending upon the time step. For example, within the time step S1 or S3, only pixel data of the RAW image or the $n^2/1$ demosaic image and the 1/1 demosaic image are inputted, but within the time step S4, further pixel data of the 1/4 demosaic image and the 1/16 demosaic image are inputted. Therefore, in the present embodiment, from within an image that includes a time step within which data are not inputted, part of image data inputted just before are outputted utilizing the time step so that the sizes of the data outputted within the time steps are almost equalized.

Figure 9:
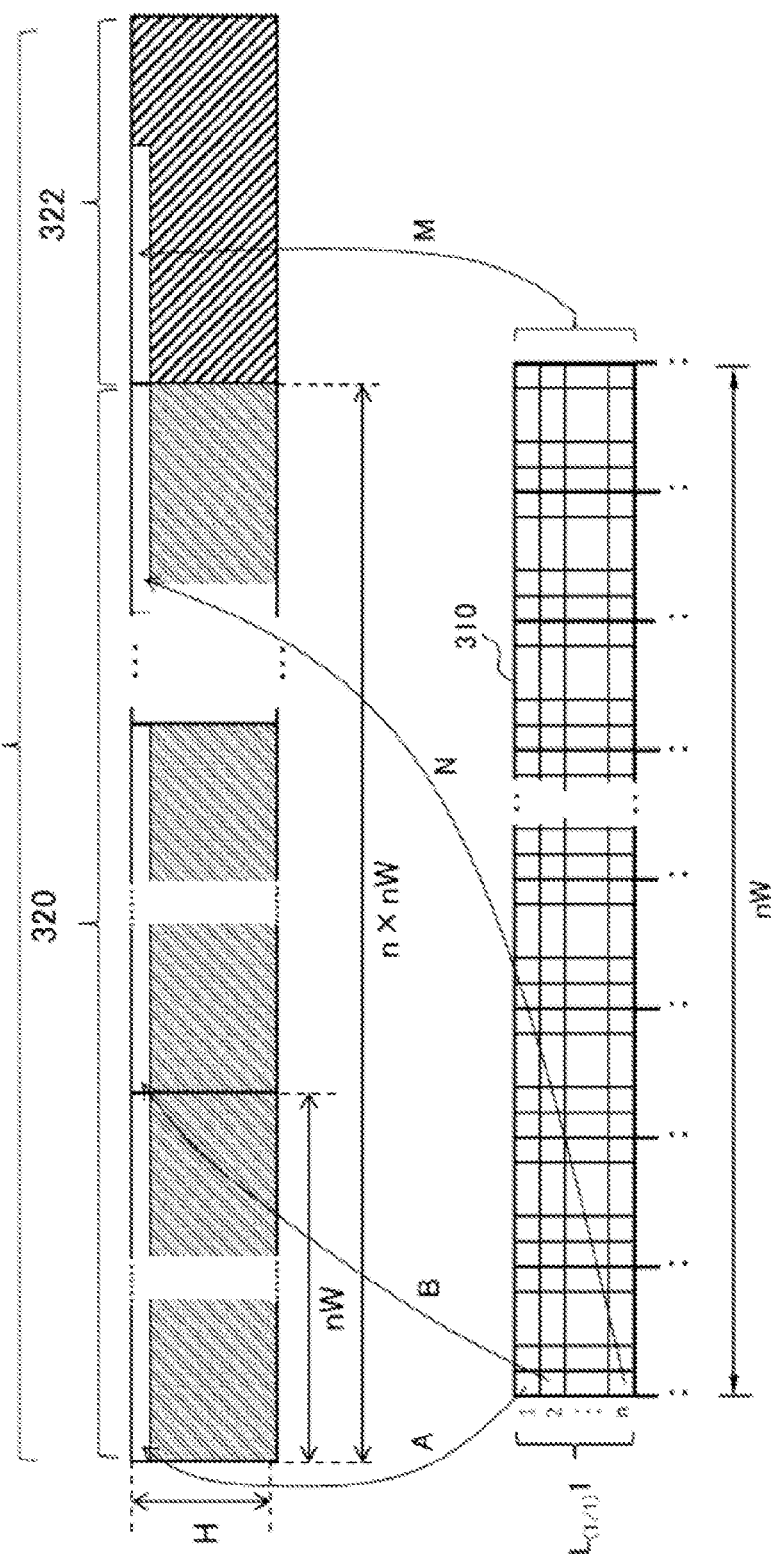
FIG. 9 is a diagrammatic view schematically illustrating a manner in which the image synthesis unit of FIG. 5 connects pixel data of a plurality of kinds of images to produce a synthetic image.

FIG. 9 schematically illustrates a manner wherein the image synthesis unit 30 connects pixel data of a plurality of kinds of images to produce a synthetic image. A synthetic image 312 is configured from a region 320 for a RAW image or an $n^2/1$ demosaic image and another region 322 for 1/1 and higher reduction rate demosaic images. As described hereinabove, the synthetic image 312 uses an input period of pixel data for one row of a 1/1 demosaic image as a basic period and basically connects pixel strings of various kinds of images inputted within the basic period to produce pixels of one horizontal line. In particular, the synthetic image 312 first connects pixel data of the $n^2/1$ demosaic image for the n rows used for the production of one row of the 1/1 demosaic image as they are in the order of the first row, second row, . . . , nth row. This similarly applies also to the RAW image.

In short, the first row of the synthetic image 312 includes a pixel row composed of a connection of a pixel string of the first row, a pixel string of the second row, . . . and a pixel string of the nth row of the RAW image or the image 310 having a horizontal width of nW pixels (arrow marks A, B, . . . , N). Further, the pixel string $L_{(1/1)}1$ of the first line of a 1/1 demosaic image produced using the pixel data obtained by the connection is connected (arrow mark M). A resulting data sequence corresponds to the time step S1 illustrated in FIG. 8 and therefore is defined as first row of the synthetic image 312.

Then, in order to produce a second row of the synthetic image 312, pixel data of the $n^2/1$ demosaic image or the RAW image for n rows used for production of the second row of the 1/1 demosaic image are connected from the (n+1)th row to the 2 nth row in this order. Then, a pixel string $L_{(1/1)}2$ of the second row of the 1/1 demosaic image produced using the pixel data in the connection is connected. Since also a pixel string $L_{(1/1)}1$ of the first line of a 1/4 demosaic image is produced within the time step S2 at this time as illustrated in FIG. 8, also this is connected. However, it is to be noted that the pixel strings of the 1/4 and higher reduction rate demosaic images are connected in a unit smaller than one row within each time step to almost equalize the size of data to be outputted as described hereinabove. A particular example is hereinafter described.

A similar sequence of processes is repeated for each row of the synthetic image 312 to produce such a synthetic image 312 as illustrated in FIG. 9. It is to be noted that, although, from within the synthetic image 312, only the first row is represented by a hollow rectangle, pixel data are suitably substituted into the other regions. Where the pixel data of the RAW image or the $n^2/1$ demosaic image are connected for n rows to produce one pixel string of one row in this manner, the region 320 of the synthetic image 312 has a size in the vertical direction equal to 1/n time that of the original image, namely, has a size of H pixels as depicted in FIG. 9.

By such processes as described above, pixel data of the RAW image or the $n^2/1$ demosaic image and corresponding pixel data of the 1/1 demosaic image are included into the same row of the synthetic image 312 and the number of rows can be made equal between the region 320 and the region 322. It is to be noted that the size of the synthetic image 312 in the vertical direction strictly is a value equal to the sum of H pixels and several pixels including an invalid region as hereinafter described.

On the other hand, the size of the region 320 in the horizontal direction is n×nW pixels as illustrated in FIG. 9 by connecting an n number of nW pixels. Since the image synthesis unit 30 actually connects pixel data of rows to produce a stream and outputs the stream as described hereinabove, the synthetic image 312 is not produced as a two-dimensional plane. However, by defining a virtual image plane with such a horizontal width as illustrated in FIG. 9, cutting out of data by the data selection section 184 can be implemented by a clipping process similar to that for a general image.

Figure 10:
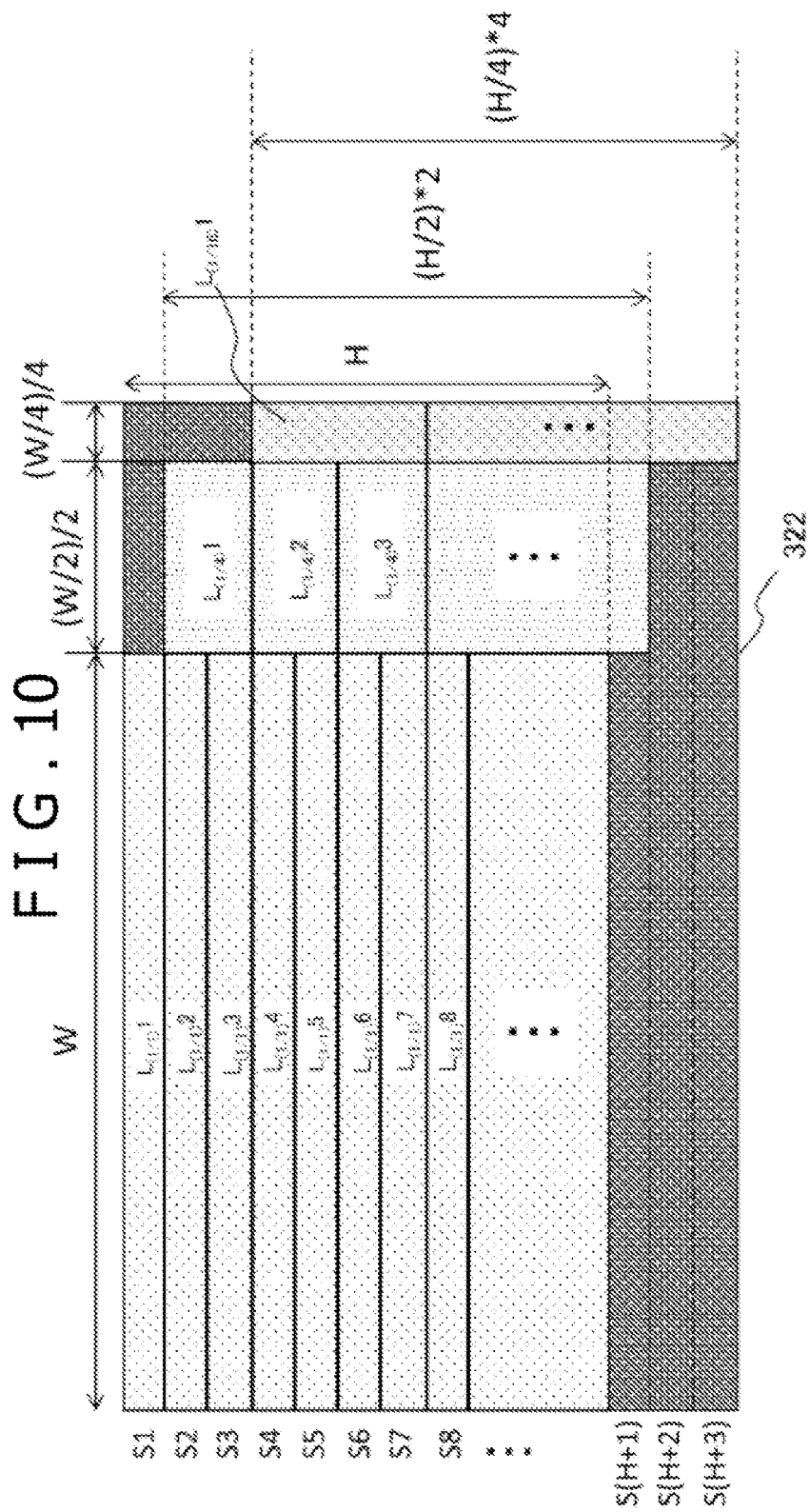
FIG. 10 is a diagrammatic view schematically illustrating a manner in which the image synthesis unit of FIG. 5 connects 1/1 and higher reduction rate demosaic images.

FIG. 10 schematically illustrates a manner in which the image synthesis unit 30 connects 1/1 and higher reduction rate demosaic images to produce the region 322 of FIG. 9. It is to be noted that, while, in FIG. 10, a manner in which only the three kinds of demosaic images depicted in FIG. 8 are connected is illustrated in order to facilitate understandings, actually image data from the left and right cameras are connected alternately as hereinafter described. In FIG. 10, S0, S1, S2, S3, . . . denote the time steps described hereinabove with reference to FIG. 8, and pixel data for one row of a 1/1 demosaic image are inputted within the individual periods.

In FIG. 10, a pixel string outputted as part of the synthetic image from the image synthesis unit 30 within each time step is indicated by a dotted rectangle which is different among different images. As described hereinabove with reference to FIG. 8, within the time step S1, only pixel data of the pixel string $L_{(1/1)}1$ of the first line of the 1/1 demosaic image are inputted. The image synthesis unit 30 temporarily stores the pixel data into the FIFO buffer 170a and then reads out and outputs the temporarily stored data after it outputs pixel data for n rows of the RAW image or the $n^2/1$ demosaic image. It is to be noted that each row of the 1/1 demosaic image is configured from W pixels as described hereinabove and as depicted in FIG. 10.

Within the next time step S2, pixel data of the pixel string $L_{(1/1)}2$ of the second line of the 1/1 demosaic image and pixel data of the pixel string $L_{(1/1)}1$ of the first line of the 1/4 demosaic image are inputted in parallel at such a timing as illustrated in FIG. 8. The image synthesis unit 30 temporarily stores the inputted pixel data into the FIFO buffers 170a and 172a. Then, after the image synthesis unit 30 outputs pixel data for n rows of the RAW image or the $n^2/1$ demosaic image, it reads out the pixel data of the pixel string $L_{(1/1)}2$ of the second line of the 1/1 demosaic image from the FIFO buffer 170a and outputs the read out pixel data.

After all of the pixel values of the pixel string $L_{(1/1)}2$ of the second line of the 1/1 demosaic image are outputted, then the image synthesis unit 30 reads out the pixel string $L_{(1/4)}1$ of the first line of the 1/4 demosaic image from the FIFO buffer 172a and outputs the read out data. At this time, taking an amount of data to be outputted within the succeeding time step S3 into consideration, pixel data of only those pixels in a first half from among all pixels of the pixel string $L_{(1/4)}1$ of the first line of the 1/4 demosaic image (those pixels in a left half of the image plane) are outputted while the remaining data are continuously retained in the FIFO buffer 172a.

Within the next time step S3, only pixel data of the pixel string $L_{(1/1)}3$ of the third line of the 1/1 demosaic image are inputted. The image synthesis unit 30 temporarily stores the inputted pixel data into the FIFO buffer 170a and reads out and outputs the temporarily stored pixel data after it outputs pixel data for n rows of the RAW image or the $n^2/1$ demosaic image. Then, the image synthesis unit 30 reads out those pixel data in the latter half (right half of the image plane) of the pixel string $L_{(1/1)}1$ of the first line of the 1/4 demosaic image which have not been outputted as yet from the FIFO buffer 172a and outputs the read out pixel data.

Within the next time step S4, pixel data of the pixel string $L_{(1/1)}4$ of the fourth line of the 1/1 demosaic image and pixel data of the pixel string $L_{(1/4)}2$ of the second line of the 1/4 demosaic image and the pixel string $L_{(1/16)}1$ of the first line of the 1/16 demosaic image are inputted in parallel at such a timing as illustrated in FIG. 8. The image synthesis unit 30 temporarily stores the inputted pixel data into the FIFO buffers 170a, 172a, and 174a. Then, after pixel data for n rows of the RAW image or the $n^2/1$ demosaic image are outputted, the image synthesis unit 30 reads out the pixel data of the pixel string $L_{(1/1)}4$ of the fourth line of the 1/1 demosaic image from the FIFO buffer 170a and outputs the read out pixel data.

After all of the pixel data of the pixel string $L_{(1/1)}4$ of the fourth line of the 1/1 demosaic image are outputted, a first half of the pixel string $L_{(1/4)}2$ of the second line of the 1/4 demosaic image is subsequently read out from the FIFO buffer 172a and outputted. Then, the pixel string $L_{(1/16)}1$ of the first line of the 1/16 demosaic image is outputted. At this time, taking an amount of data to be outputted within the three succeeding time steps S5, S6, and S7 into consideration, the pixel string $L_{(1/16)}1$ of the first line of the 1/16 demosaic image is divided into four, and only data of the first division are outputted. The data of the remaining divisions are stored into the FIFO buffer 174a.

Within the next time step S5, only pixel data of the pixel string $L_{(1/1)}5$ of the fifth line of the 1/1 demosaic image are inputted. The image synthesis unit 30 temporarily stores the pixel data into the FIFO buffer 170a and then reads out and outputs the temporarily stored data after it outputs pixel data for n rows of the RAW image or the $n^2/1$ demosaic image. Then, the image synthesis unit 30 reads out the pixel data of the latter half of the pixel string $L_{(1/4)}2$ of the second line of the 1/4 demosaic image which have not been outputted as yet from the FIFO buffer 172a and outputs the read out pixel data. Further, the image synthesis unit 30 outputs the pixel data of the second division of the pixel string $L_{(1/16)}1$ of the first line of the 1/16 demosaic image which have not been outputted as yet.

Similarly, within the next time step S6, the image synthesis unit 30 outputs, subsequently to the pixel data for n rows of the RAW image or the $n^2/1$ demosaic image, pixel data of the pixel string $L_{(1/1)}6$ of the sixth line of the 1/1 demosaic image, pixel data of the first half of the pixel string $L_{(1/4)}3$ of the third line of the 1/4 demosaic image, and pixel data of the third division of the pixel string $L_{(1/16)}1$ of the first line of the 1/16 demosaic image. Within the next time step S7, the image synthesis unit 30 outputs, subsequently to pixel data for n rows of the RAW image or the $n^2/1$ demosaic image, pixel data of the pixel string $L_{(1/1)}7$ of the seventh line of the 1/1 demosaic image, pixel data of the latter half of the pixel string $L_{(1/4)}3$ of the third line of the 1/4 demosaic image, and pixel data of the last division of the pixel string $L_{(1/16)}1$ of the first line of the 1/16 demosaic image.

In particular, the pixel string $L_{(1/1)}1$ of the first line of the 1/4 demosaic image is outputted half by half within two time steps including the time steps S2 and S3. The pixel string $L_{(1/16)}1$ of the first line of the 1/16 demosaic image is outputted by one fourth within the four time steps S4, S5, S6, and S7. Where the pixel number of the 1/1 demosaic image in the horizontal direction is W, since the pixel number for one row of the 1/4 demosaic image and the 1/16 demosaic image is W/2 and W/4, respectively, data of (W/2)/2 and (W/4)/4 pixels are outputted per time step as depicted in FIG. 10.

The outputting sequence of processes described above is repeated down to the lowermost row of the image. At this time, at a point of time at which pixel data of the lowermost row of the 1/1 demosaic image are outputted, the pixel data of the latter half of the lowermost row of the 1/4 demosaic image and the pixel data of the remaining three fourths of the lowermost row of the 1/16 demosaic image are not outputted as yet. It is to be noted that, since the RAW image or the data of the $n^2/1$ demosaic image and the data of the 1/1 demosaic image have an equal number of rows (H pixels) in the synthetic image, data outputting of them is completed at the same row.

The image synthesis unit 30 continues outputting of pixel data of the synthetic image until it completes outputting of the data which have not been outputted as yet. In particular, within a time step S(H+1) immediately after outputting of all rows of the 1/1 demosaic image is completed, the pixel data of the latter half of the lowermost row of the 1/4 demosaic image and the pixel data of the second one of the four divisions of the lowermost row of the 1/16 demosaic image are outputted.

At this time, as data for the n×nW pixels having been outputted as data of the RAW image or the $n^2/1$ demosaic image and data for W pixels having been outputted as data of the 1/1 demosaic image, invalid data are outputted first. Following the invalid data, data of the 1/4 demosaic image and the 1/16 demosaic image are outputted. Within the succeeding two time steps S(H+2) and S(H+3), as data for n×nW pixels having been outputted as data of the RAW image or the $n^2/1$ demosaic image and data for W+(W/2)/2 pixels having been outputted as data of the 1/1 demosaic image and the 1/4 demosaic image, invalid data are outputted first. Following the invalid data, pixel data of the third and fourth ones of the four divisions of the lowermost row of the 1/16 demosaic image are outputted.

If such an outputting process as described above is applied, then within the region 322 of the synthetic image, data of W+(W/2)/2+(W/4)/4=21W/16 pixels are outputted within all time steps except the first three time steps and the last three steps. Further, in order to output pixel data for one row, the 1/1 demosaic image requires one time step; the 1/4 demosaic image requires two time steps; and the 1/16 demosaic image requires four time steps. Therefore, the number of time steps required to output image data for one frame is given by H=(H/2)×2=(H/4)×4 and is equal with regard to all of the images. The total time step number required to output data for one frame of the three kinds of images and hence the pixel number of the synthetic image 312 in the vertical direction, is given as H+3.

The data outputted from the image synthesis unit 30 are an enumeration of pixel data as described above. However, if the number of pixels corresponding to each time step, namely, n×nW+21W/16 is given as the number of pixels for one horizontal line, then the image sending unit 32 can treat data to be outputted within the time steps as data for one horizontal line of the image similarly to a general image.

Accordingly, each time step can be made correspond to pixels in the vertical direction of an image, and as a result, such a synthetic image 312 as depicted in FIG. 9 is produced. By fixing a range to be occupied by data of each image in a pixel string outputted within each time step as described above, data of a RAW image or an $n^2/1$ demosaic image, a 1/1 demosaic image, a 1/4 demosaic image, and 1/16 demosaic image individually configure a unitary rectangular region. Therefore, if this locality is utilized, then cutting out of data for each image can be carried out easily.

Figure 11:
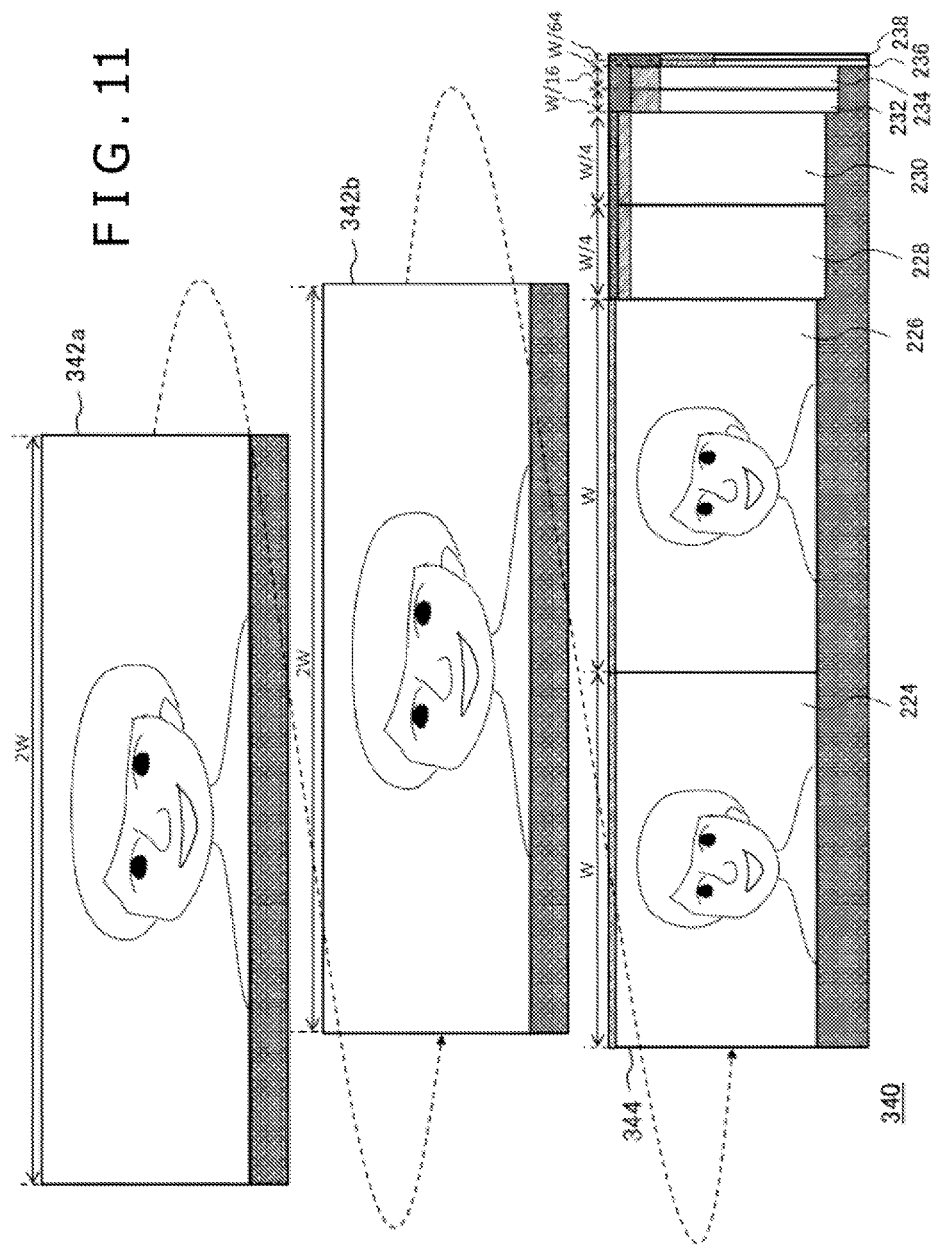
FIG. 11 is a view schematically depicting an example of a synthetic image produced when processes described with reference to FIGS. 9 and 10 are repeated alternately for various image data outputted from the first camera and a second camera shown in FIG. 2.

FIG. 11 depicts an example of a synthetic image produced when the processes described hereinabove with reference to FIGS. 9 and 10 are repeated alternately for left and right image data outputted from the first camera 22a and the second camera 22b, respectively. In the example of FIG. 11, it is assumed that principally an image of the face of the user 1 is picked up and the RAW image has a resolution of n=2, namely, a size of 2W pixels in the horizontal direction and 2H pixels in the vertical direction. Further, it is assumed that demosaic images up to a 1/64 demosaic image are produced by the pyramid filter section 135a.

A synthetic image 340 configured from a first region 342a, a second region 342b, and a third region 344 connected to each other in the horizontal direction. The first region 342a includes only data of pixel strings of the first, third, fifth, . . . , and (2H−1)th rows of the RAW image or the $n^2/1$ demosaic image. The second region 342b includes only data of pixel strings of the second, fourth, . . . , and 2Hth rows of the RAW image or the $n^2/1$ demosaic image. The third region 344 includes 1/1 and higher reduction rate demosaic images. In FIG. 11, a broken line arrow mark represents a connection relationship between the regions.

The RAW image and the $n^2/1$ demosaic image have a size equal to twice that of the 1/1 demosaic image, which is used as the reference, in the horizontal and vertical directions. Therefore, if a pixel string is extracted from every other row to produce the first region 342a and the second region 342b, then they are configured from an image of a size of 2W pixels in the horizontal direction and H pixels in the vertical direction. The third region 344 is configured from a 1/1 demosaic image 224 originating from the first camera 22a, a 1/1 demosaic image 226 originating from the second camera 22b, a 1/4 demosaic image 228 originating from the first camera 22a, a 1/4 demosaic image 230 originating from the second camera 22b, a 1/16 demosaic image 232 originating from the first camera 22a, a 1/16 demosaic image 234 originating from the second camera 22b, a 1/64 demosaic image 236 originating from the first camera 22a, and a 1/64 demosaic image 238 originating from the second camera 22b.

In FIG. 11, an image of the face of the user 1 picked up from the left and the right is represented on the 1/1 demosaic images 224 and 226. The other demosaic images, namely the 1/4 demosaic images 228 and 230, 1/16 demosaic images 232 and 234, and 1/64 demosaic images 236 and 238 are images obtained by reducing the 1/1 demosaic images to 1/4, 1/16, and 1/64 and dividing the pixel row of one horizontal line into two, four, and eight and then arranging the divisions of the pixel strings in the vertical direction.

Accordingly, as indicated by shading at the top end of each image, in the third region 344, a region of pixels for one row of the 1/1 demosaic images 224 and 226 corresponds to a region of pixels for two rows of the 1/4 demosaic images 228 and 230, a region of pixels for four rows of the 1/16 demosaic images 232 and 234, and a region of pixels for eight rows of the 1/64 demosaic images 236 and 238. It is to be noted that, in FIG. 11, the width of one line of pixels is shown with a greater width than an actual width to facilitate understandings. Therefore, although a region of invalid data indicated by dense shading is represented wider, actually the region of invalid data is seven rows in the maximum from the principle described hereinabove with reference to FIG. 10 and is equal to or less than 1% of the total area of the synthetic image 340.

The data selection section 184 of the image sending unit 32 cuts out only image data requested by the host terminal 20 from the synthetic image 340. The process executed by the data selection section 184 is similar to a general cropping process of cutting out a designated rectangular region in an image to exclude the surplus region. In the present embodiment, the processing target is not an image plane but an image row unit. Thus, if information of the pixel number for one row of a synthetic image is made available, then it is easy to associate a two-dimensional coordinate of an image plane with a one-dimensional coordinate of a stream, and specification of a pixel to be cut out can be carried out similarly.

In the present embodiment, data of a RAW image or an $n^2/1$ demosaic image, left and right 1/1 demosaic images, 1/4 demosaic images, 1/16 demosaic images, and 1/64 demosaic images are put together in rectangular regions on the synthetic image 340. Therefore, cutting of the images can be carried out easily by the cropping process.

Figure 12:
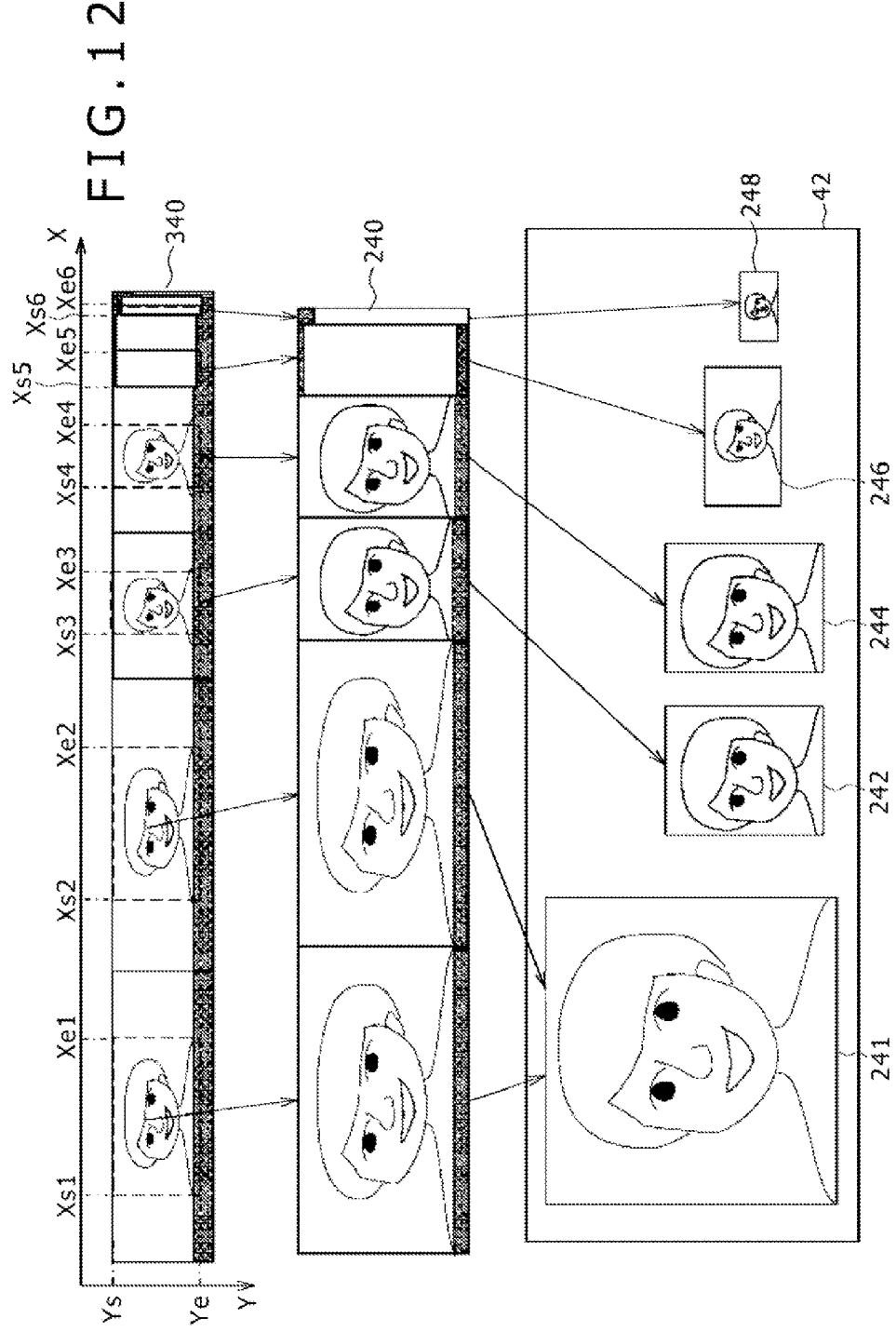
FIG. 12 is a view schematically depicting a flow of image data in response to a request from the host terminal of FIG. 2.

FIG. 12 schematically illustrates a flow of image data in accordance with a request from the host terminal 20. Referring to FIG. 12, the host terminal 20 first transmits a data request signal that designates a region in a synthetic image to the image pickup apparatus 12. Here, for example, the host terminal 20 designates a range of pixels in the vertical direction and a range of pixels in the horizontal direction of the synthetic image 340.

In the example of FIG. 12, six regions within a range of (minimum value, maximum value)=(Ys, Ye) in the vertical direction (Y axis) and within ranges of (minimum value, maximum value)=(Xs1, Xe1), (Xs2, Xe2), (Xs3, Xe3), (Xs4, Xe4), (Xs5, Xe5), and (Xs6, Xe6) in the horizontal direction (X axis) are designated. The images within the ranges (Xs1, Xe1) and (Xs2, Xe2) represent a region around the face in the two images obtained by extracting pixel data for every other row from the RAW image or the $n^2/1$ demosaic image. The images within the ranges (Xs3, Xe3) and (Xs4, Xe4) represent a region around the face in the 1/1 demosaic images of the left and right cameras. The image within the range (Xs5, Xe5) is an entire 1/4 demosaic image of one of the cameras. The image within the range (Xs6, Xe6) is an entire 1/16 demosaic image of one of the cameras.

The data selection section 184 cuts out pixel data within a designated range from within a synthetic image inputted for every one row by the image synthesis unit 30. In particular, the data selection section 184 extracts, from pixel data of a row corresponding to Ys, only pixel data within the ranges (Xs1, Xe1), (Xs2, Xe2), (Xs3, Xe3), (Xs4, Xe4), (Xs5, Xe5), and (Xs6, Xe6) and successively sends out the extracted pixel data to the data formation section 186. Then, the data selection section 184 extracts, from a row corresponding to Ys+1, a row corresponding to Ys+2, . . . , pixel data within the same range similarly and sends the extracted pixel data to the data formation section 186. The data formation section 186 forms data for transmission by successively connecting the pixel data transmitted thereto to form a stream or by packetizing the pixel data.

As a result, the image data received by the host terminal 20 are a stream wherein a new synthetic image 240 configured only from the cut out regions is connected for each row. The information processing unit 38 of the host terminal 20 cuts out the synthetic image 240 into individual images based on the ranges of pixels designated upon the data request and develops the images to successive addresses of the main memory 42. In this case, the RAW image or the $n^2/1$ demosaic image which have been separated into the two divisional images is successively connected alternately in the vertical direction in order beginning with the first pixel row to restore an original image. Further, the 1/4 and higher reduction rate demosaic images wherein one row is folded back in a plurality of rows are connected in the horizontal direction to restore the individual rows.

As a result, in the main memory 42, an image 241 around the face from within the RAW image or the $n^2/1$ demosaic image, images 242 and 244 around the face from within the left and right 1/1 demosaic images, an entire image 246 of the 1/4 demosaic image and an entire image 248 of the 1/16 demosaic image are stored. Alternatively, the information processing unit 38 may develop the synthetic image 240 as it is into the main memory 42 such that the images mentioned above are distinguished at a stage at which they are used for image processing or the like.

In this manner, the host terminal 20 can request a kind of an image and a specific region of the image simultaneously by designating a region in a synthetic image. Then, the data selection section 184 successively extracts pixel data within the designated range from the individual rows of the synthetic image to cut out a plurality of image data simultaneously and produce a new stream composed only of necessary image data.

In the present mode, the host terminal 20 designates a common range in the vertical direction of a plurality of regions. In the example of FIG. 12, all of the six designated regions have a range of (Ys, Ye) in the vertical direction. By such designation, even if the data selection section 184 carries out extraction of pixel data individually for each row of the synthetic image, the extracted range is same in all rows. As a result, even if the extracted pixels are connected to form a stream, such a situation that the number of extracted pixels differs between different rows can be eliminated. Thus, the new synthetic image 240 exhibits a state in which an image plane of a cut out rectangular region is maintained as it is. Consequently, the host terminal 20 can develop individual images readily from the acquired stream based on the requested pixel number in the horizontal direction for each of the regions.

If such data as depicted in FIG. 12 are transmitted from the image pickup apparatus 12, then the host terminal 20 can carry out, for example, such a process as described below. In particular, the host terminal 20 uses the images 242 and 244 around the face of the left and right 1/1 demosaic images to carry out stereo matching thereby to acquire the position of a target such as the face in a three-dimensional space or carry out facial expression recognition. On the other hand, the host terminal 20 uses only the face region of the entire image 246 of the 1/4 demosaic image or the image 241 around the face of the RAW image or the $n^2/1$ demosaic image to produce an image of a raised resolution. Then, the host terminal 20 carries out image processing in response to the position in the three-dimensional space or the facial expression recognition and then displays the resulting image. The entire image 248 of the 1/16 demosaic image is used to designate a region of the face by a rough face detection process and adjust the requested range of the $n^2/1$ demosaic image or the 1/1 demosaic image.

However, the processing that is carried out by the host terminal 20 is not limited to the processes descried above, and various combinations of data may be requested depending upon use of the host terminal 20. Further, in the example of FIG. 12, the RAW image or the $n^2/1$ demosaic image is cut out by a cropping process and transmitted so that a significant place such as a region around the face is displayed with a high degree of accuracy without increasing the necessary communication band. On the other hand, in an environment in which an abundant communication band can be prepared, the entire region may be displayed in a high definition without carrying out such cutting out as described above. In this manner, the type and the range of data to be transmitted from the image pickup apparatus 12 are suitably adjusted depending also upon the communication band, the processing capacity of the image pickup apparatus 12, or the host terminal 20 and so forth. In the present embodiment, such adjustment can be implemented readily only by designating a data range in a synthetic image.

Figure 13:
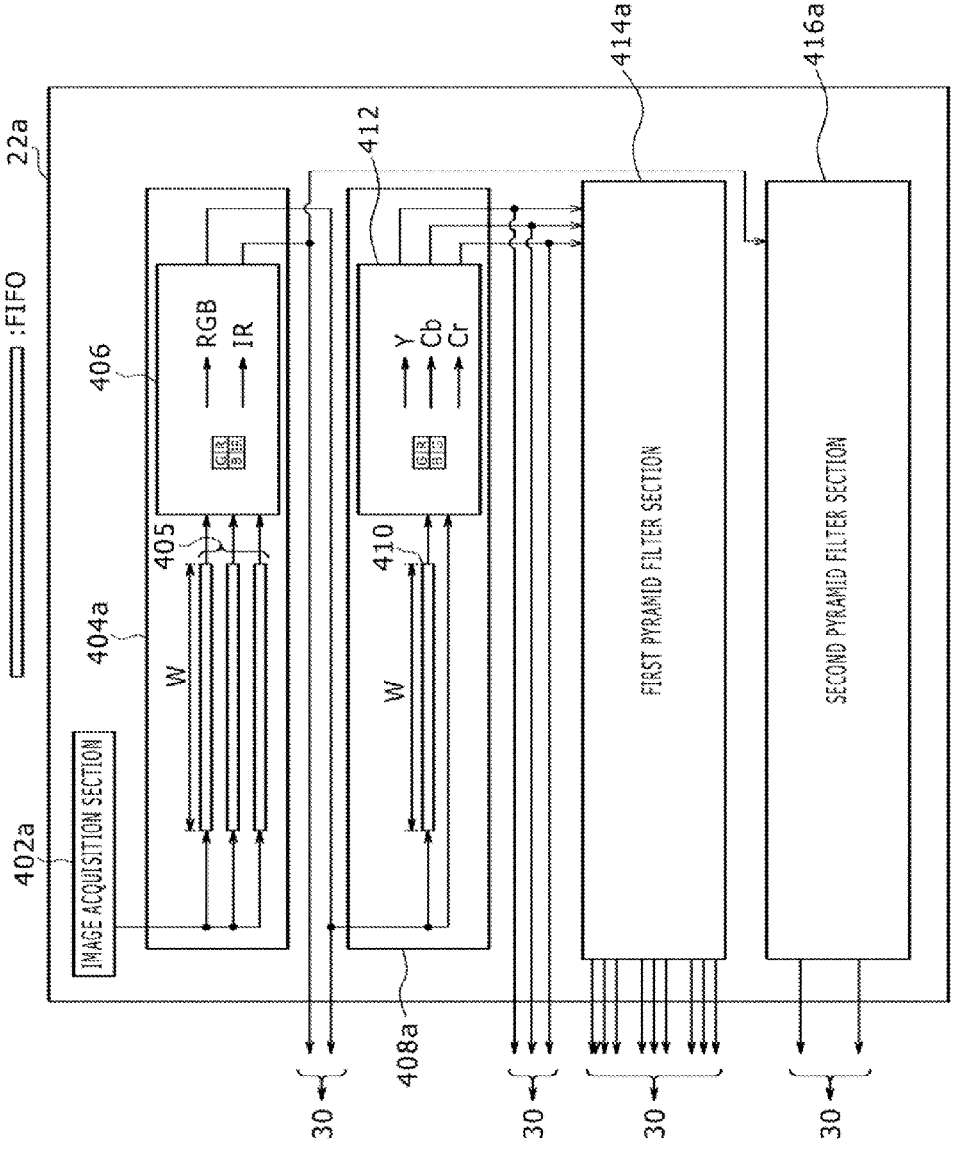
FIG. 13 is a block diagram particularly depicting a configuration of the first camera of FIG. 2 where the first camera includes a function for acquiring information of infrared light together with color information based on visible light.

In the embodiment described above, a system that can transmit and process image data in a similar procedure without significantly changing the configuration even if the resolution of the camera increases is implemented. Now, as another example, a mode in which similar data transmission and processing can be carried out even where the camera has a function for detecting a plurality of kinds of physical quantities is described. FIG. 13 particularly depicts a configuration of the first camera 22a including a function for acquiring information of infrared light together with color information by visible light. For example, in a game apparatus and so forth, a technology has been placed into practice wherein infrared light is irradiated upon a target by an irradiation member provided separately and reflected light of the infrared light is detected to detect the position or the movement of the target in a three-dimensional space.

The image pickup element of the first camera 22a includes such an infrared light sensor together with a visible light sensor. By the image pickup elements, data of a picked up image in which each pixel has a G value, a B value, and an infrared light amount (IR value) are acquired for each block of 2×2 pixels. It is to be noted that also the second camera 22b of the image pickup apparatus 12 may have the same configuration or may be configured such that it does not include an infrared light sensor as described hereinabove with reference to FIG. 3. Further, the physical quantity to be detected by a sensor other than the visible light sensor may be any physical quantity that has been placed into practical use as a detection target by a camera such as ultraviolet light or X rays and that is not limited to infrared light.

The first camera 22a includes an image acquisition section 402a, a data separation section 404a, a demosaic section 408a, a first pyramid filter section 414a, and a second pyramid filter section 416a. The image acquisition section 402a reads out an image exposed by the image pickup element and including values of the RGB and IR at a predetermined frame rate. The image has widths of W pixels in the horizontal direction and H pixels in the vertical direction. However, the image may otherwise have widths of nW pixels in the horizontal direction and nH pixels in the vertical direction and be combined with the mode described hereinabove with reference to FIG. 3. Every time exposure for one horizontal line of an image is completed, the image acquisition section 402a sends data of the horizontal line to the data separation section 404a.

The data separation section 404a includes a FIFO buffer 405 configured from a plurality of (three in FIG. 13) FIFO buffers having a capacity for W pixels, and a separation processing portion 406. The FIFO buffers configuring the FIFO buffer 405 are used cyclically and successively store pixel data for one horizontal line of a picked up image inputted from the image acquisition section 402a so that pixel data for a plural number of rows can be retained. The separation processing portion 406 reads out pixel data of a picked up image for a predetermined number of rows from the FIFO buffer 405 and uses the read out data to produce a general RGB image in which each pixel holds some of R, G and B values and an infrared image in which each pixel holds an IR value to separate the data.

Figure 14:
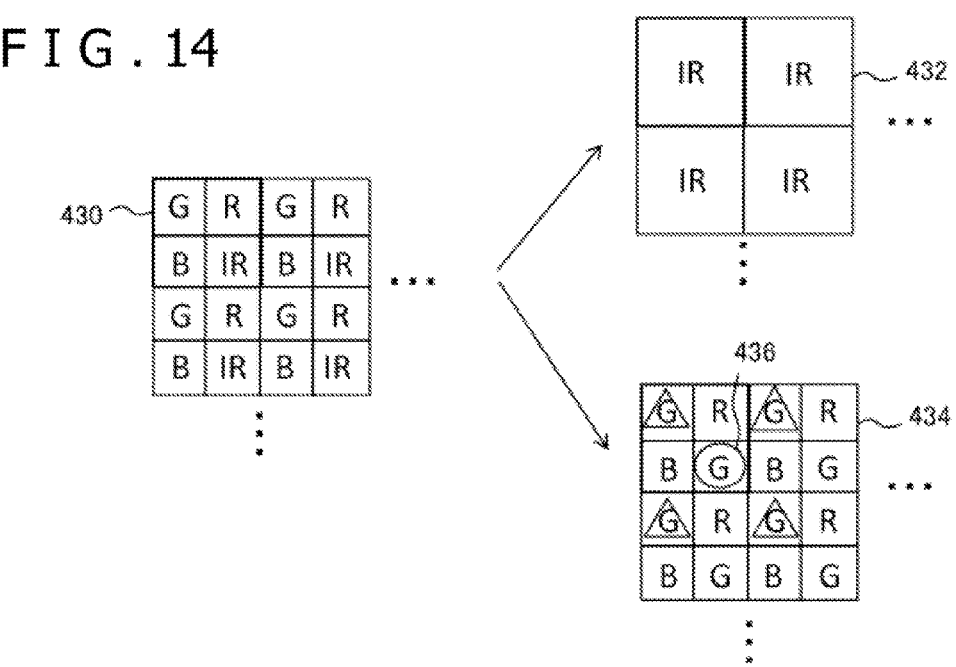
FIG. 14 is a view illustrating a separation processing procedure of data by a separation processing portion of the first camera shown in FIG. 13.

FIG. 14 illustrates a separation processing procedure of data by the separation processing portion 406. A picked up image 430 has a data format wherein, for each block (for example, a thick line frame) of 2×2 pixels as depicted in FIG. 14, each pixel has some of a G value, an R value, a B value, and an IR value. It is to be noted that the positional relationship of pixels having such values is not limited to that depicted in FIG. 14. The separation processing portion 406 first extracts IR values, which are included by one in each block, from the picked up image 430 and places the IR values as the pixel values of the blocks to produce an IR image 432. In other words, the IR image 432 has a size equal to one half that of the picked up image 430 in both of the horizontal and vertical directions.

Then, the separation processing portion 406 determines a G value for those pixels of the picked up image 430 which have an IR value and sets the G values as pixel values to produce an RGB image 434 of a format similar to that of a general RGB image. For example, the G value of a pixel indicated by a round mark 436 in the RGB image 434 is calculated by bilinear interpolation using the G values held by four pixels (rectangular marks) at the left upper, right upper, left lower, and right lower positions of the pixel. Although the calculation method for the G value is not limited to this, in any case, the number of FIFO buffers which configure the FIFO buffer 405 is determined in accordance with the number of rows necessary for such calculation.

Referring back to FIG. 13, the data separation section 404a calculates, from a picked up image having a horizontal width of W pixels, pixel data of an RGB image of the same size and an IR image having a size equal to 1/2 that of the picked up image in both of the horizontal and vertical directions and outputs the image data for each row. The pixel data of the RGB image are sent to the image synthesis unit 30 and the demosaic section 408a. The pixel data of the IR image are sent to the image synthesis unit 30 and the second pyramid filter section 416a. The demosaic section 408a includes a FIFO buffer 410 having a capacity for W pixels and a simple demosaic processing portion 412 and produces a demosaic image having YCbCr values from the RGB image.

Since the demosaic image has a horizontal width of W pixels that is a reference size for inputting to the first pyramid filter section 414a, it is a 1/1 demosaic image. Even if IR values are included in a picked up image, since an RGB image of a general format is produced by the data separation section 404a, the processing to be executed by the demosaic section 408a may be similar to the processing carried out by the demosaic section 104a described hereinabove with reference to FIG. 3. Therefore, description of the demosaic section 408a is omitted herein.

The data of the YCbCr image produced by the demosaic section 408a are sent to the image synthesis unit 30 and the first pyramid filter section 414a. The first pyramid filter section 414a carries out processing similar to that described hereinabove with reference to FIGS. 3 and 4 to produce Y, Cb, and Cr images of a plurality of resolutions and inputs the Y, Cb, and Cr images to the image synthesis unit 30. Also the second pyramid filter section 416a hierarchizes the IR image into images of a plurality of resolutions similarly to the second pyramid filter section 416a and outputs the resulting images.

Accordingly, the second pyramid filter section 416a may have a configuration and functions similar to those of the pyramid filter section 135a described hereinabove with reference to FIGS. 3 and 4 except that the input data and the output data are those of one kind, namely, an IR value. However, in the present embodiment, the IR image inputted to the second pyramid filter section 416a has a size equal to 1/4 time the reference size, two filters may be used for the reduction process.

Figure 15:
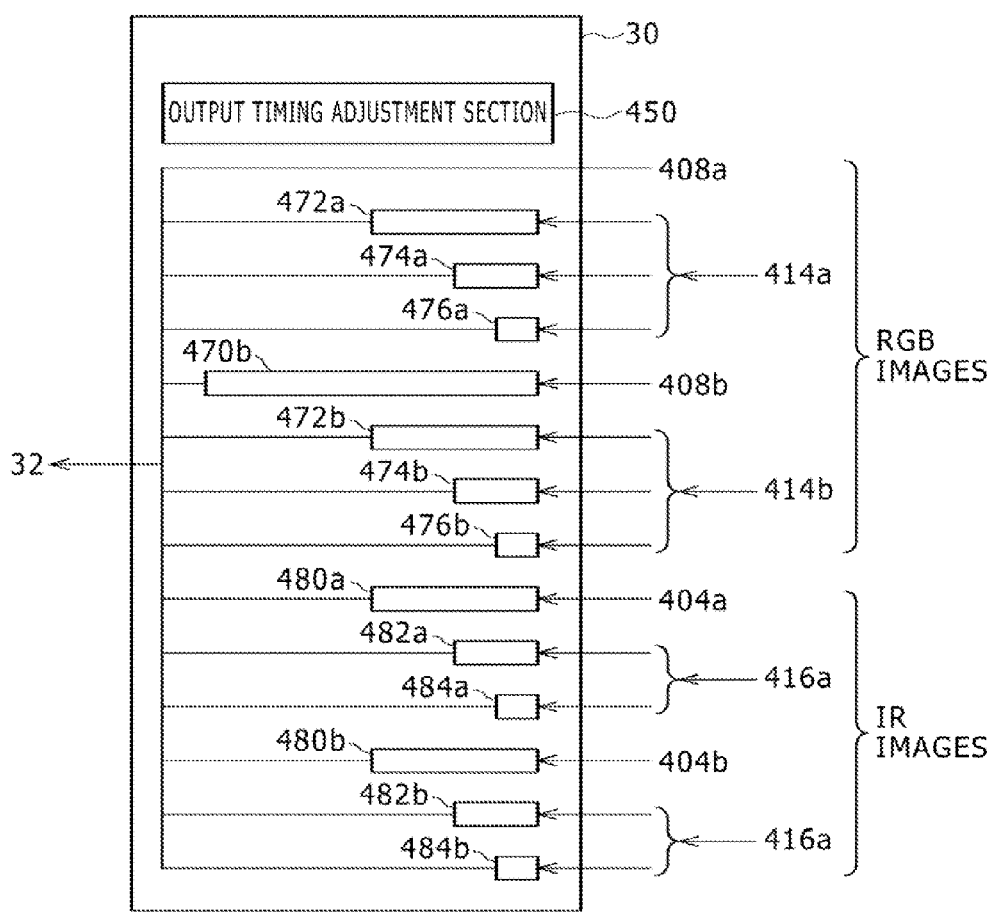
FIG. 15 is a block diagram depicting a configuration of the image synthesis unit corresponding to the configuration of the camera shown in FIG. 13.

FIG. 15 depicts a configuration of the image synthesis unit 30 corresponding to the configuration of the camera depicted in FIG. 13. The image synthesis unit 30 includes an output timing adjustment section 450 for adjusting an output timing of various kinds of image data sent thereto from the first camera 22a and the second camera 22b to the image sending unit 32. The image synthesis unit 30 further includes FIFO buffers 472a, 474a, 476a, 470b, 472b, 474b, 476b, 480a, 482a, 484a, 480b, 482b, and 484b for output timing adjustment.

It is to be noted that, in FIG. 15, also the second camera 22b has a configuration similar to that depicted in FIG. 13. Thus, the data separation section, demosaic section, first pyramid filter section, and second pyramid filter section of the second camera 22b are referred to as data separation section 404b, demosaic section 408b, first pyramid filter section 414b, and second pyramid filter section 416b with corresponding reference characters added thereto, respectively.

The FIFO buffers 472a, 474a, and 476a retain YCbCr pixel values for one row of a 1/4 demosaic image, a 1/16 demosaic image, and a 1/64 demosaic image transmitted thereto from the first pyramid filter section 414a of the first camera 22a, respectively. Accordingly, the FIFO buffers 472a, 474a, and 476a retain W/2, W/4, and W/8 pixel values, respectively. The FIFO buffer 470b retains pixel values for one row of a 1/1 demosaic image transmitted thereto from the demosaic section 408b of the second camera 22b, namely, W pixel values. It is to be noted that RGB images sent out from the data separation sections 404a and 404b may be acquired in place of the 1/1 demosaic images from both of the first camera 22a and the second camera 22b.

The FIFO buffers 472b, 474b, and 476b retain YCbCr pixel values for one row of a 1/4 demosaic image, a 1/16 demosaic image, and a 1/64 demosaic image transmitted thereto from the first pyramid filter section 414b of the second camera 22b, respectively. Accordingly, the FIFO buffers 472b, 474b, and 476b retain W/2, W/4, and W/8 pixel values, respectively.

The FIFO buffer 480a further retains pixel values for one row of an IR image of the 1/4 size sent thereto from the data separation section 404a of the first camera 22a. The FIFO buffers 482a and 484a retain pixel values for one row of an IR image of the 1/16 size and an IR image of the 1/64 size transmitted thereto from the second pyramid filter section 416a of the first camera 22a, respectively. Accordingly, the FIFO buffers 480a, 482a, and 484a retain W/2, W/4, and W/8 pixel values, respectively.

The FIFO buffer 480b retains pixel values for one row of an IR image of the 1/4 size sent thereto from the data separation section 404b of the second camera 22b. The FIFO buffers 482b and 484b retain pixel values for one row of an IR image of the 1/16 size and an IR image of the 1/64 size sent thereto from the second pyramid filter section 416b of the second camera 22b, respectively. Accordingly, the FIFO buffers 480b, 482b, and 484b retain W/2, W/4, and W/8 pixel values, respectively.

The output timing adjustment section 450 basically adjusts an output timing of image data to the image sending unit 32 in accordance with a policy similar to that described hereinabove with reference to FIG. 5. In particular, the output timing adjustment section 450 first outputs pixel data for one row of a 1/1 demosaic image sent thereto from the demosaic section 408a of the first camera 22a to the image sending unit 32. Then, the output timing adjustment section 450 outputs pixel data for one row of a 1/1 demosaic image of the second camera 22b stored in the FIFO buffer 470b.

Within a period within which a second or succeeding row of a 1/1 demosaic image is outputted, pixel data of a 1/4 demosaic image, a 1/16 demosaic image, and a 1/64 demosaic image are successively produced and stored into the FIFO buffers. Therefore, at least part of data for one row of the images are cyclically outputted similarly as in the case described hereinabove with reference to FIG. 10. Further, the output timing adjustment section 450 outputs also the IR images of the individual resolutions continuously to the demosaic images in accordance with a rule similar to that for the 1/4 demosaic image, 1/16 demosaic image, and 1/64 demosaic image.

In the camera, a color image and an IR image are subjected to processes independent of each other after separation by the data separation sections 404a and 404b. Therefore, the inputting timings of a demosaic image and an IR image to the image synthesis unit 30 are independent of each other. However, the output timing adjustment section 450 adjusts the output timings of the demosaic image and the IR image in accordance with a rule determined in advance. For example, the output timings are adjusted such that corresponding rows of the demosaic image and the IR image having an equal size are included in the same row of a synthetic image and the images individually form a rectangular region.

Consequently, data designation from the host terminal 20, cutout by the data selection section 184, development of an image in the host terminal 20 and so forth can be effectively carried out irrespective of the kind of an image. To this extent, the outputting order of demosaic images and an IR image, namely, disposition of them in a synthetic image, may be set reversely. Alternatively, a synthetic image configured from demosaic images and another synthetic image configured from IR images may be produced separately from each other and in parallel to each other.

Figure 16:
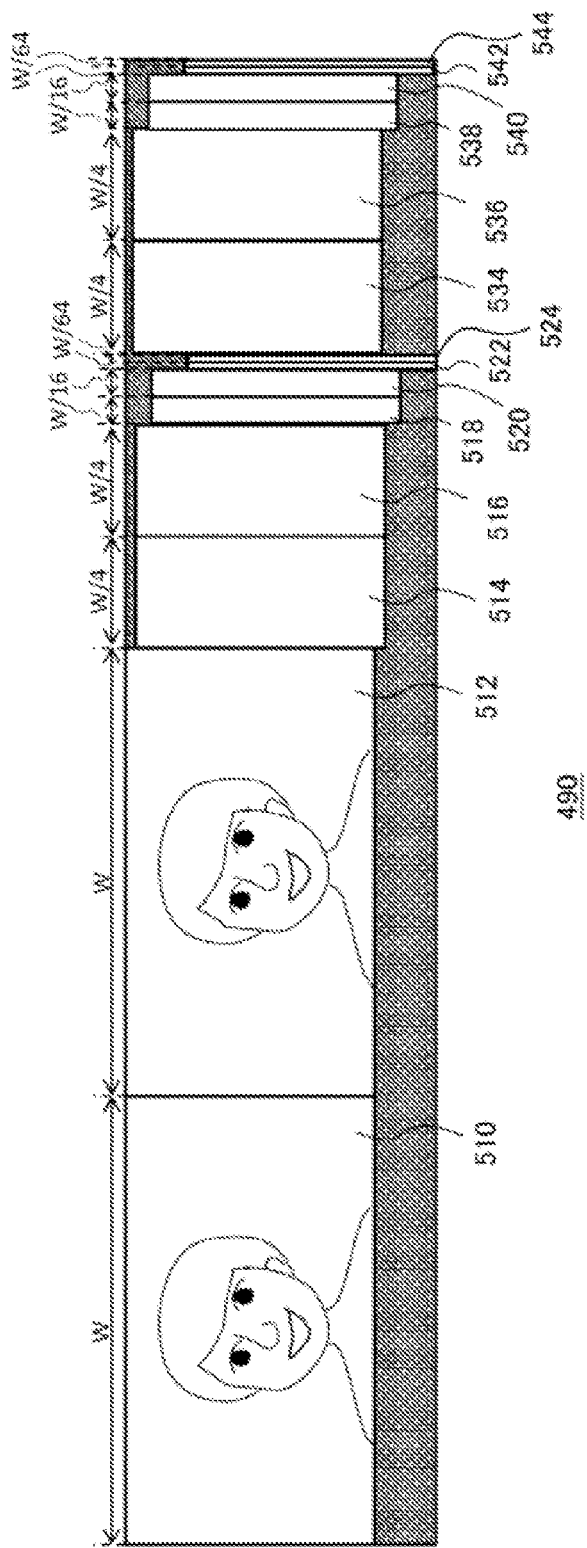
FIG. 16 is a schematic view depicting an example of a synthetic image produced by the configuration described with reference to FIGS. 13 to 15.

FIG. 16 depicts an example of a synthetic image produced by the configuration described hereinabove with reference to FIGS. 13 to 15. Referring to FIG. 16, a synthetic image 490 is configured from a 1/1 demosaic image 510 originating from the first camera 22a, a 1/1 demosaic image 512 originating from the second camera 22b, a 1/4 demosaic image 514 originating from the first camera 22a, a 1/4 demosaic image 516 originating from the second camera 22b, a 1/16 demosaic image 518 originating from the first camera 22a, a 1/16 demosaic image 520 originating from the second camera 22b, a 1/64 demosaic image 522 originating from the first camera 22a, a 1/64 demosaic image 524 originating from the second camera 22b, a 1/4-sized IR image 534 originating from the first camera 22a, a 1/4-sized IR image 536 originating from the second camera 22b, a 1/16-sized IR image 538 originating from the first camera 22a, a 1/16-sized IR image 540 originating from the second camera 22b, a 1/64-sized IR image 542 originating from the first camera 22a, and a 1/64-sized IR image 544 originating from the second camera 22b.

In FIG. 16, images of the face of the user 1 picked up from the left and the right are represented on the 1/1 demosaic images 510 and 512, respectively. The remaining demosaic images, namely, the 1/4 demosaic images 514 and 516, 1/16 demosaic images 518 and 520, and 1/64 demosaic images 522 and 524 are obtained by reducing the 1/1 demosaic images to 1/4, 1/16, and 1/64 and dividing a pixel row of the images obtained by the reduction in a horizontal direction into 1/2, 1/4, and 1/8 and then arranging resulting images by the division in a vertical direction, respectively. Also the 1/4-sized IR images, 1/16-sized IR images, and 1/64-sized IR images have configurations similar to those of the 1/4 demosaic images, 1/16 demosaic images, and 1/64 demosaic images, respectively.

The data cutout process and transmission process carried out by the image sending unit 32 and the development to the main memory 42 in the host terminal 20 are similar to those described hereinabove with reference to FIG. 12. As a result, the host terminal 20 can easily acquire a kind of an image and a region of the image necessary for the processes to be carried out thereby from the image pickup apparatus 12 irrespective of whether the image is a color image or an IR image. For example, the host terminal 20 can recognize a movement or a gesture of the user 1 using an IR image having some resolution and specify a person by a face recognition process using a 1/16 demosaic image, and can carry out some process for a display image based on a 1/1 demosaic image. The accuracy in position detection of a target using an IR image deteriorates at a light place such as an outdoor place in the daytime. Therefore, the data to be acquired may be changed over between an IR image and a stereo image in response to an image pickup environment. Also in this case, the host terminal 20 can easily implement the changeover only by varying the range designation in the synthetic image.

The kind or the region of an image of a target of acquisition may be adjusted in response to the communication band, the performance of the image pickup apparatus 12 or the host terminal 20 or the like as described hereinabove. Further, the rate when the host terminal 20 acquires data may be varied depending upon the kind of the image such that only image data to be used for displaying or tracking are acquired at a high rate whereas the other image data are acquired at a low rate. Further, where it is clear that it is not necessary to carry out stereo matching by utilizing an infrared light sensor or in a like case, a single camera may be used to configure the image pickup apparatus 12. Further, two cameras may be configured different from each other to increase the physical quantity capable of being acquired or the variation of the resolution.

Figure 17:
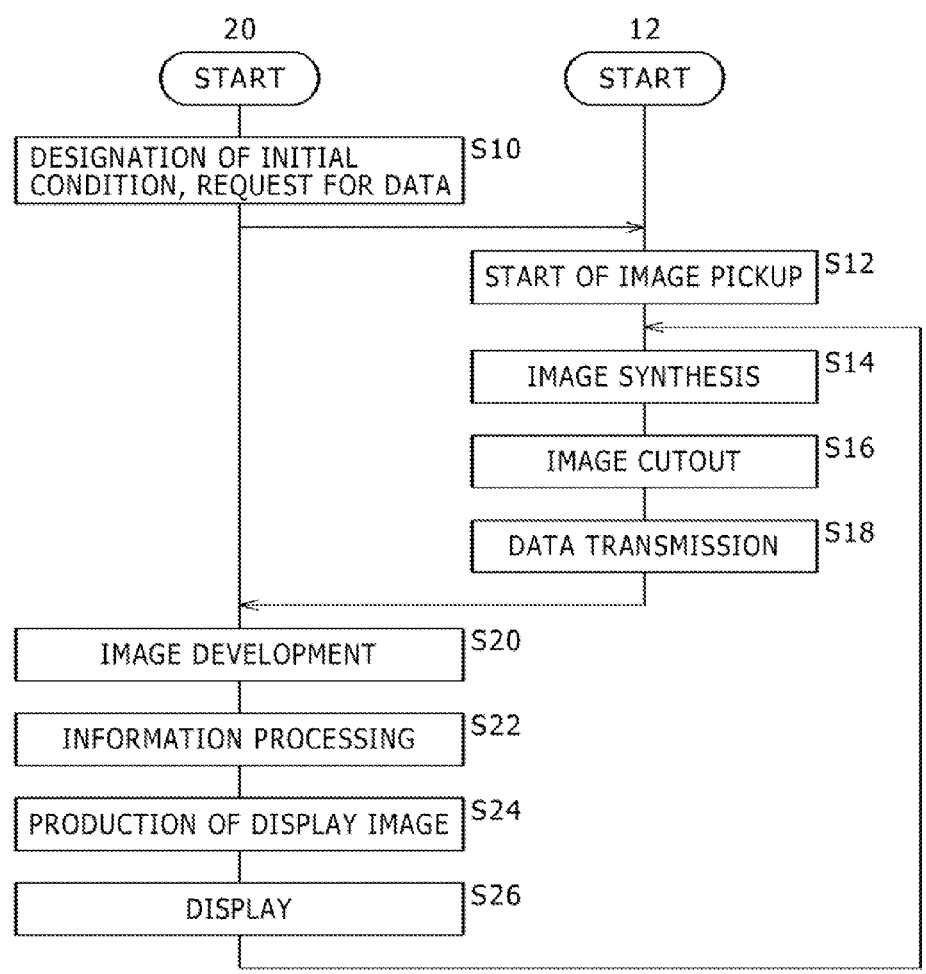
FIG. 17 is a flow chart illustrating an example of a processing procedure when the host terminal and the image pickup apparatus depicted in FIG. 1 cooperate with each other to carry out information processing.

FIG. 17 is a flow chart illustrating an example of a processing procedure in which the host terminal 20 and the image pickup apparatus 12 cooperated with each other to carry out information processing. The process illustrated in the flow chart of FIG. 17 is started by inputting a starting instruction of an application to the host terminal 20 by the user. Although, in FIG. 17, steps are represented as directly connected rectangles in order to facilitate understandings, the steps are executed in parallel for pixel strings and frames within a period within which a moving picture is picked up.

First, the host terminal 20 designates an initial condition and necessary image data set in an application program or the like and issues an image pickup starting instruction and a data transmission request to the image pickup apparatus 12 (S10). The initial condition includes a resolution, a frame rate, a shutter speed, and an angle of view of moving pictures to be picked up by the two cameras of the image pickup apparatus 12, whether or not an IR image is to be acquired and so forth. It is to be noted that the resolution and the frame rate of the moving pictures to be picked up by the cameras may be varied by varying the condition setting for exposure itself by the image pickup element or by processing data from the image pickup element later.

Although necessary image data are designated in the form of a region of a synthetic image as described above, as an initial value, a 1/1 demosaic image of a region in which it is expected that the user exists, an overall image having some resolution or some other image is designated. The first camera 22a and the second camera 22b of the image pickup apparatus 12 that accepts a designation of an initial condition and an image data request start image pickup of moving pictures in accordance with the received initial condition (S12).

The images acquired by the cameras are processed for each row, and at least some of a RAW image, demosaic images of the sizes, and an IR image outputted within each time step are synthesized by the image synthesis unit 30 (S14). Then, the image sending unit 32 cuts out only the image data designated at step S10 from the synthetic image to produce a stream and then transmits the stream to the host terminal 20 (S16 and S18).

The image processing unit 38 of the host terminal 20 that receives the data develops the stream transmitted thereto as an image in the main memory 42 (S20). The image processing unit 38 carries out processing in accordance with the application during execution using the developed image (S22). At this time, image processing is requested to the image processing unit 40 as occasion demands, and the image processing unit 40 reads out the image from the main memory 42 and carries out a process or synthesis. Since the image data developed in the main memory 42 is similar to general image data, also it is possible to read out the image data as a texture.

At step S22, the image processing unit 38 may carry out image analysis processing such as stereo matching, tracking, face detection, or gesture detection so that a result of the image analysis processing is reflected on a display image. The display image is produced in this manner and is displayed on the display apparatus 16 (S24 and S26). Further, the image processing unit 38 may specify a region of a target or the like based on the image analysis described above at step S22 so that the requested image data are changed. In this case, the data selection section 184 of the image pickup apparatus 12 changes the region to be cut out in accordance with the designation at a timing at which a new image frame is processed. By repetitively carrying out the processes at steps S14 to S26, a result of the information processing carried out using the image picked up by the image pickup apparatus 12 can be successively displayed on the display apparatus 16.

With the present embodiment described above, in the system including the image pickup apparatus that picks up an image of a movement of the user or the like and the host terminal that carries out image displaying utilizing the picked up image, the image pickup apparatus produces a plurality of kinds of image data based on the picked up image. Then, the pixel data of images are cyclically connected in a unit of a row to produce a stream, and part of the stream is extracted and transmitted in accordance with a request from the host terminal. Consequently, the size of the memory to be provided in the image pickup apparatus can be suppressed to the lowest limit, and it is not necessary to wait that data for one frame are prepared in all processes from image pickup to data transmission to the host terminal. Therefore, image displaying in response to a movement can be carried out in low latency as an overall system.

Further, the pixel data of the corresponding row produced within the same period from among the plurality of kinds of image data are connected continuously such that a corresponding relationship among the plurality of kinds of images becomes definite. At this time, the range of pixel data to be continuously included in the stream is determined in response to the data production period that depends upon the kind of the image so that the number of pixels when the connection of the pixel data makes one round is substantially equal. The image pickup apparatus basically produces an image having a low resolution from an image having a high resolution, and the number of pixels indicating the same region increases as the resolution increases. Therefore, qualitatively a high-resolution image is included in the stream in a greater range, for example, in a unit of a plurality of rows of pixel data. On the other hand, an image having a lower resolution is included in the stream in a smaller range, for example, in a unit of pixel data in a range that is a fraction of one row.

Consequently, pixel data that have a relevancy in terms of the position on the image and the production timing are included in continuous ranges in the stream. As a result, outputting of the stream can be carried out in low latency and the size of data to be processed and transmitted per unit time becomes substantially uniform. Further, estimation of the time required till the outputting, the transmission band to be used, and the time required for transmission can be carried out easily, and besides the possibility decreases that the transmission band may be pressed by sudden increase of the data size.

By defining the number of pixels when the connection of the pixel data makes one cycle in a stream as a horizontal width, it can be considered that the synthetic image including the plurality of kinds of images is produced virtually. Since the data of the various kinds of images are cyclically included in the stream, each of the various kinds of images forms a rectangular region in the synthetic image having the horizontal width. Accordingly, by designating a region in the synthetic image, it is possible to designate not only a kind of an image but also a region included in the image at the same time to extract image data. Since this process is similar to a general cropping process, it can be incorporated readily.

The effects described hereinabove can be implemented irrespective of the kind or the resolution of images to be acquired by the image pickup apparatus if the range of pixel data to be included in a stream and the timing of inclusion of the pixel data into the stream are suitably controlled. As a result, a system capable of being ready for increase of the resolution or enhancement of functions of the image pickup apparatus and having high expandability can be implemented at a low cost without significantly changing the apparatus configuration.

The present disclosure has been described based on the embodiment thereof. The embodiment described hereinabove is illustrative, and it can be recognized by a person skilled in the art that various modifications can be made for combinations of the components and the processing procedures of the embodiment and that also the modifications are included in the spirit and scope of the present disclosure.

The present disclosure contains subject matter related to that disclosed in Japanese Priority Patent Application JP 2013-094402 filed in the Japan Patent Office on Apr. 26, 2013, the entire content of which is hereby incorporated by reference.

What is claimed is:

1. An image pickup apparatus, comprising:
    an image data production unit configured to produce data of a plurality of kinds of images from a picked up image obtained by image pickup of an image pickup object and successively output the data for pixels of one horizontal line;
    an image synthesis unit configured to cyclically connect the data of the plurality of kinds of images outputted from the image data production unit for each pixel string within a range set in advance for each of the kinds of the images and output the connected data as a stream to produce a virtual synthetic image that includes the plurality of kinds of images and in which a pixel string when the connection makes one round is a pixel string for one horizontal line; and
    an image sending unit configured to accept, from a host terminal connected to the image pickup apparatus, a data transmission request that designates a rectangular region in the virtual synthetic image, extract and connect data from the stream in accordance with the data transmission request and transmit the connected data as a new stream to the host terminal;
    the image synthesis unit connecting pixel stings as a stream of the plurality of kinds of images such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line.

2. The image pickup apparatus according to claim 1, wherein, where the reference image size has a horizontal width of W pixels, the image synthesis unit connects a pixel string for n rows of the images, which have a horizontal width of nW pixels, for each row, n being a natural number.

3. The image pickup apparatus according to claim 1, wherein the image data production unit includes:
    a pyramid filter configured to reduce an image of the reference image size to a plurality of stages to produce data of a plurality of reduced images having different sizes from each other; and
    a size adjustment section configured to adjust the size of a picked up image to the reference image size and input the picked up image of the adjusted size to the pyramid filter, and
    the image synthesis unit connects an image of a size before adjustment by the size adjustment section, an image of the reference image size after the adjustment, and a plurality of reduced images produced by the pyramid filter for each pixel string.

4. The image pickup apparatus according to claim 1, wherein the image data production unit includes a data separation section configured to separate picked up images picked up by a camera that includes a visible light sensor and an infrared light sensor into a color image and an infrared image, and
    the image synthesis unit cyclically connects the color image and the infrared image for each pixel string within individually corresponding ranges so that the synthesis image includes the color image and the infrared image.

5. The image pickup apparatus according to claim 4, wherein the image data production unit acquires stereo images picked up by two cameras, which pick up images of a pickup object from left and right points of view spaced from each other by a known distance, as picked images, and the image synthesis unit cyclically connects the color images and the infrared images of the stereo images for each pixel string within individually corresponding ranges so that the synthetic image includes the color images and the infrared images of the stereo images such that, in response to designation of a rectangular region by the host terminal, data of a transmission object can be changed over between the stereo images and the infrared images.

6. An information processing system, comprising:

an image pickup apparatus configured to produce data of a plurality of kinds of images from a picked up image obtained by image pickup of an image pickup object; and a host terminal configured to acquire at least part of the data of the images and utilize the acquired data to carry out predetermined information processing;

the image pickup apparatus including an image data production unit configured to produce data of the plurality of kinds of images and successively output the produced data for each pixel in one horizontal line, an image synthesis unit configured to cyclically connect the data of the plurality of kinds of images outputted from the image data production unit for each pixel string within a range set in advance for each of the kinds of the images and output the connected data as a stream to produce a virtual synthetic image that has the plurality of kinds of images and in which a pixel string when the connection makes one round is a pixel string for one horizontal line, and an image sending unit configured to accept, from the host terminal, a data transmission request that designates a rectangular region in the virtual synthetic image, extract and connect data from the stream in accordance with the data transmission request and transmit the connected data as a new stream to the host terminal;

the image synthesis unit connecting pixel stings of the plurality of kinds of images such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line;

the host terminal including a data requesting unit configured to request at least part of data of the plurality of kinds of images produced by the image pickup apparatus by designating a rectangular region of the virtual synthetic image, and a data development unit configured to separate the stream transmitted thereto from the image pickup apparatus into data of the individual images based on information of the designated rectangular region, return the separated data to the positions in the original pixel strings to restore the image and then develop the image into a memory.

7. An image data processing method carried out by an image pickup apparatus, comprising:

acquiring a picked up image obtained by image pickup of an image pickup object from an image pickup element, producing data of a plurality of kinds of images based on the acquired picked up image and successively outputting the data for pixels of one horizontal line;

cyclically connecting the data of the outputted plurality of kinds of images for each pixel string within a range set in advance for each of the kinds of the images and outputting the connected data as a stream to produce a virtual synthetic image that includes the plurality of kinds of images and in which a pixel string when the connection makes one round is a pixel string for one horizontal line; and accepting, from a host terminal connected to the image pickup apparatus, a data transmission request that designates a rectangular region in the virtual synthetic image, extracting and connecting data from the stream in accordance with the data transmission request and transmitting the connected data as a new stream to the host terminal;

the production of the synthetic image including connection of pixel stings of the plurality of kinds of images carried out such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line.

8. A non-transitory computer readable medium having a computer program for causing a computer to execute:

producing data of a plurality of kinds of images from a picked up image obtained by image pickup of an image pickup object and successively outputting the data for pixels of one horizontal line;

cyclically connecting the data of the outputted plurality of kinds of images for each pixel string within a range set in advance for each of the kinds of the images and outputting the connected data as a stream to produce a virtual synthetic image that includes the plurality of kinds of images and in which a pixel string when the connection makes one round is a pixel string for one horizontal line; and accepting, from a host terminal connected to the image pickup apparatus, a data transmission request that designates a rectangular region in the virtual synthetic image, extracting and connecting data from the stream in accordance with the data transmission request and transmitting the connected data as a new stream to the host terminal;

the production of the synthetic image having connection of pixel stings of the plurality of kinds of images carried out such that those images that have a size equal to a reference image size determined in advance are connected for each horizontal line thereof; those images that have a size greater than the reference image size are connected for each range thereof greater than one horizontal line; and those images that have a size smaller than the reference image size are connected for each range thereof smaller than one horizontal line.

* * * * *